(12) United States Patent
Mola

(10) Patent No.: US 11,669,434 B2
(45) Date of Patent: *Jun. 6, 2023

(54) DIFFING OF REPLAYABLE EXECUTION TRACES

(71) Applicant: Microsoft Technology Licensing, LLC, Redmond, WA (US)

(72) Inventor: Jordi Mola, Bellevue, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/545,961

(22) Filed: Dec. 8, 2021

(65) Prior Publication Data

US 2022/0100638 A1 Mar. 31, 2022

Related U.S. Application Data

(63) Continuation of application No. 16/814,762, filed on Mar. 10, 2020, now Pat. No. 11,243,869, which is a (Continued)

(51) Int. Cl.
*G06F 11/00* (2006.01)
*G06F 11/36* (2006.01)
(Continued)

(52) U.S. Cl.
CPC ........ *G06F 11/3636* (2013.01); *G06F 9/3009* (2013.01); *G06F 9/485* (2013.01); *G06F 11/3466* (2013.01)

(58) Field of Classification Search
CPC .... G06F 9/3009; G06F 9/485; G06F 11/3466; G06F 11/3636
See application file for complete search history.

(56) References Cited

U.S. PATENT DOCUMENTS 6,145,121 A * 11/2000 Levy .................. G06F 11/3466
703/22
8,997,057 B1 * 3/2015 Diwan ................ G06F 11/3636
717/124

(Continued)

OTHER PUBLICATIONS

"Non Final Office Action Issued in U.S. Appl. No. 16/743,903", dated Feb. 1, 2022, 7 Pages.

(Continued)

*Primary Examiner* — Joshua P Lottich
(74) *Attorney, Agent, or Firm* — Workman Nydegger

(57) ABSTRACT

Diffing subject and comparison traces. A first call tree representing function calls made by a first executable entity is created based on subject trace, and a second call tree representing function calls made by a second executable entity is created based on a comparison trace. A differencing tree is created from the call trees, with differencing tree nodes indicate a differencing status between the first and second call trees. A differencing cost is assigned to each differencing tree node, based at least on the nodes' differencing status. A differencing tree node is identified based on following nodes that most contribute to differences between the first and second call trees, and it is used to provide an indicia of a difference between the first and second function calls.

20 Claims, 16 Drawing Sheets

Related U.S. Application Data continuation-in-part of application No. 16/743,903, filed on Jan. 15, 2020.

(51) Int. Cl.
| | |
|---|---|
| *G06F 9/30* | (2018.01) |
| *G06F 9/48* | (2006.01) |
| *G06F 11/34* | (2006.01) |

(56) References Cited

U.S. PATENT DOCUMENTS

| | | | | |
|---|---|---|---|---|
| 9,311,220 | B1* | 4/2016 | Ha | G06F 11/079 |
| 11,455,229 | B2* | 9/2022 | Rozenberg | G06F 11/3608 |
| 2005/0183067 | A1* | 8/2005 | Dimpsey | G06F 11/36 717/128 |
| 2005/0183070 | A1* | 8/2005 | Alexander, III | G06F 11/3447 717/133 |
| 2005/0183074 | A1* | 8/2005 | Alexander, III | G06F 11/3604 717/131 |
| 2005/0183075 | A1* | 8/2005 | Alexander, III | G06F 8/443 717/128 |
| 2008/0092123 | A1* | 4/2008 | Davison | G06F 11/3676 717/128 |
| 2008/0126878 | A1* | 5/2008 | Best | G06F 11/3636 714/E11.181 |
| 2008/0178161 | A1* | 7/2008 | Cates | G06F 11/3664 717/133 |
| 2008/0244531 | A1* | 10/2008 | Schmelter | G06F 11/3636 717/128 |
| 2012/0179447 | A1* | 7/2012 | Lin | G06F 11/3696 703/22 |
| 2013/0091387 | A1* | 4/2013 | Bohnet | G06F 11/3612 714/45 |
| 2013/0160128 | A1* | 6/2013 | Dolan-Gavitt | G06F 21/577 726/25 |
| 2015/0026666 | A1* | 1/2015 | Tojo | G06F 11/3636 717/128 |
| 2015/0309915 | A1* | 10/2015 | Ajith Kumar | G06F 11/3636 717/128 |
| 2016/0019133 | A1* | 1/2016 | Forgács | G06F 11/3612 717/128 |
| 2016/0098341 | A1* | 4/2016 | Pho | G06F 11/323 714/38.1 |
| 2017/0075665 | A1* | 3/2017 | Koezuka | G06F 8/443 |
| 2017/0153963 | A1* | 6/2017 | Chahal | G06F 11/3414 |
| 2018/0060213 | A1* | 3/2018 | Mola | G06F 11/3636 |
| 2018/0150383 | A1* | 5/2018 | Alaranta | G06F 11/3433 |
| 2019/0138542 | A1* | 5/2019 | Van Beest | G06F 21/552 |
| 2019/0286549 | A1* | 9/2019 | Mola | G06F 21/6218 |
| 2019/0324891 | A1* | 10/2019 | Mola | G06F 11/3636 |
| 2019/0324892 | A1* | 10/2019 | Gabryjelski | G06F 11/3636 |
| 2019/0340103 | A1* | 11/2019 | Nelson | G06F 11/3636 |
| 2019/0361802 | A1* | 11/2019 | Li | G06F 8/40 |
| 2019/0370148 | A1* | 12/2019 | Du | G06F 11/302 |
| 2020/0110687 | A1* | 4/2020 | Hu | G06F 11/3013 |
| 2020/0142675 | A1* | 5/2020 | Jaeger | G06F 8/4441 |
| 2021/0218433 | A1* | 7/2021 | Liang | H03F 3/245 |
| 2021/0218437 | A1* | 7/2021 | Khoshnevisan | H04L 5/0012 |

OTHER PUBLICATIONS

U.S. Appl. No. 16/743,903, filed Jan. 15, 2020.
U.S. Appl. No. 16/814,762, filed Mar. 10, 2020.
U.S. Appl. No. 16/743,962, filed Jan. 15, 2020.
U.S. Appl. No. 16/743,937, filed Jan. 15, 2020.
"Final Office Action issued in U.S. Appl. No. 16/743,937", dated Jun. 17, 2022, 9 Pages.
"Final Office Action issued in U.S. Appl. No. 16/743,903", dated Jul. 15, 2022, Pages.
"Final Office Action Issued in U.S. Appl. No. 16/743,937", dated Oct. 28, 2021, 7 Pages.
"Notice of Allowance Issued in U.S. Appl. No. 16/743,903", dated Feb. 28, 2023, 8 Pages.
"Notice of Allowance Issued in U.S. Appl. No. 16/743,937", dated Mar. 2, 2023, 8 Pages.

\* cited by examiner

Debugging 109

- Data Access 114
  - Trace Access 114a
  - Code Access 114b

- Matching 119

- Grouping 115

- Alignment 116
  - Exact Match 116a
  - Approximate Match 116b

- Diffing 117
  - Differencing 117a
  - Transformation 117b
  - Emulation Comparison 117c
  - Transitive Analysis 117d
  - Ranking / Correlation 117e

- Output 118

*FIG. 1B*

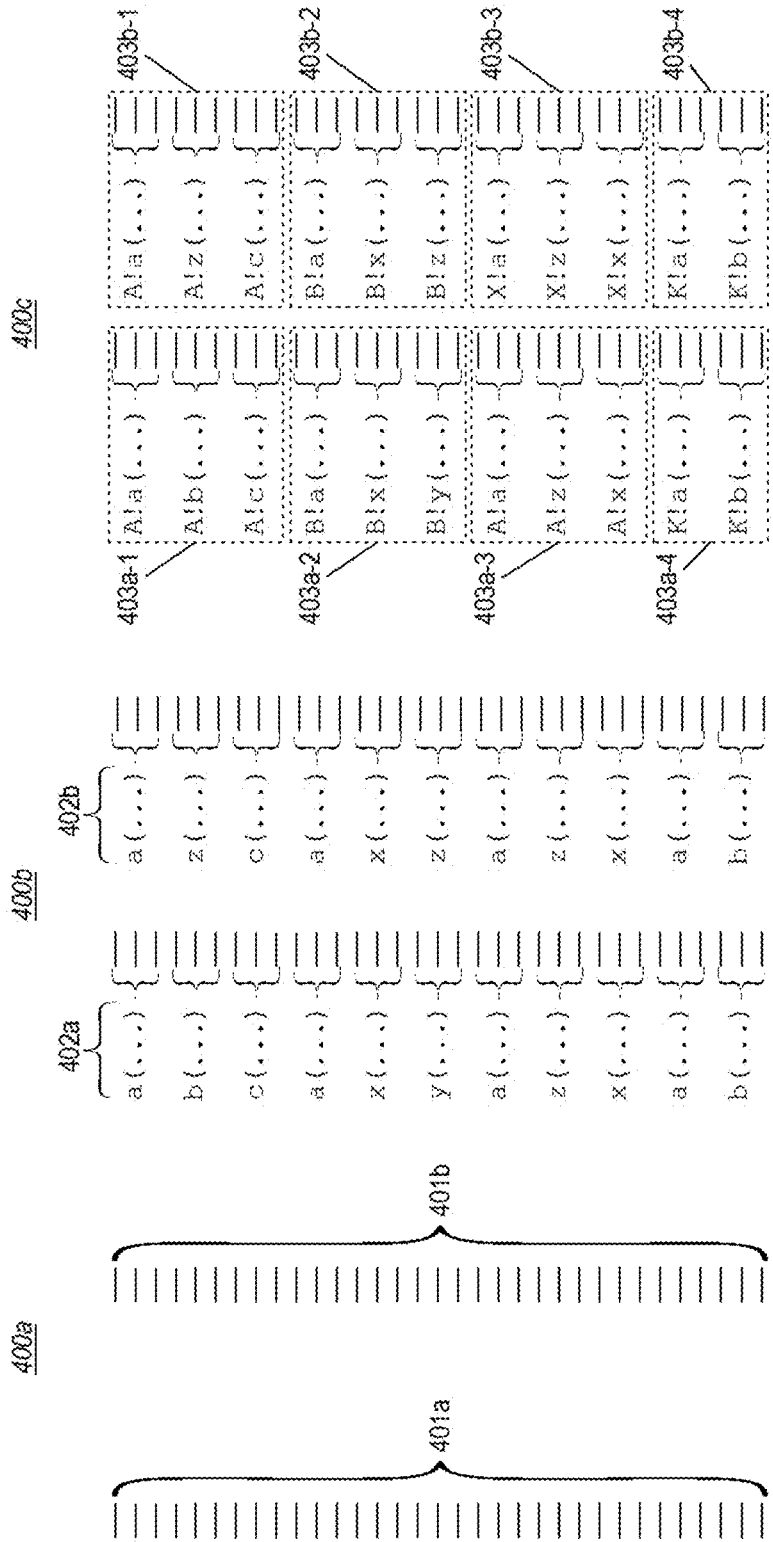

*1000a*

| P_A | | P_B | | |
|---|---|---|---|---|
| $T_{A-1}$ | $T_{A-2}$ | $T_{B-1}$ | $T_{B-2}$ | $T_{B-3}$ |
| A | B | A | B | C |
| C | D | D | E | F |
| E | F | G | H | |
| G | H | | | |

| $T_{A-1}$ | $T_{A-2}$ | $T_{B-1}$ | $T_{B-2}$ | $T_{B-3}$ |
|---|---|---|---|---|
| A | B | A | B | C |
| C | D | D | E | F |
| E | F | G | H | |
| G | H | | | |

| $T_{A-1}$ | $T_{A-2}$ | $T_{B-1}$ | $T_{B-2}$ | $T_{B-3}$ |
|---|---|---|---|---|
| A | B | A | B | C |
| C | D | D | E | F |
| E | F | G | H | |
| G | H | | | |

| $T_{A-1}$ | $T_{A-2}$ | $T_{B-1}$ | $T_{B-2}$ | $T_{B-3}$ |
|---|---|---|---|---|
| A | B | A | B | C |
| C | D | D | E | F |
| E | F | G | H | |
| G | H | | | |

| $T_{A-1}$ | $T_{A-2}$ | $T_{B-1}$ | $T_{B-2}$ | $T_{B-3}$ |
|---|---|---|---|---|
| A | B | A | B | C |
| C | D | D | E | F |
| E | F | G | H | |
| G | H | | | |

| $T_{A-1}$ | $T_{A-2}$ | $T_{B-1}$ | $T_{B-2}$ | $T_{B-3}$ |
|---|---|---|---|---|
| A | B | A | B | C |
| C | D | D | E | F |
| E | F | G | H | |
| G | H | | | |

| $T_{A-1}$ | $T_{A-2}$ | $T_{B-1}$ | $T_{B-2}$ | $T_{B-3}$ |
|---|---|---|---|---|
| A | B | A | B | C |
| C | D | D | E | F |
| E | F | G | H | |
| G | H | | | |

FIG. 10G

DIFFING OF REPLAYABLE EXECUTION TRACES

CROSS-REFERENCE TO RELATED APPLICATIONS

This application is a continuation of U.S. patent application Ser. No. 16/814,762, filed Mar. 10, 2020, and entitled "DIFFING OF REPLAYABLE EXECUTION TRACES," which is a continuation-in-part of U.S. patent application Ser. No. 16/743,903, filed Jan. 15, 2020, and entitled "DIFFING A SUBJECT REPLAYABLE EXECUTION TRACE AGAINST A COMPARISON REPLAYABLE EXECUTION TRACE." The entire contents of each of the foregoing applications are incorporated by reference herein in their entireties.

BACKGROUND

Tracking down and correcting undesired software behaviors is a core activity in software development. Undesired software behaviors can include many things, such as execution crashes, runtime exceptions, slow execution performance, incorrect data results, data corruption, and the like. Undesired software behaviors might be triggered by a vast variety of factors such as data inputs, user inputs, race conditions (e.g., when accessing shared resources), etc. Given the variety of triggers, undesired software behaviors can be rare and seemingly random, and extremely difficult reproduce. As such, it can be very time-consuming and difficult for a developer to identify a given undesired software behavior. Once an undesired software behavior has been identified, it can again be time-consuming and difficult to determine its root cause(s).

Developers have conventionally used a variety of approaches to identify undesired software behaviors, and to then identify the location(s) in an application's code that cause the undesired software behavior. For example, a developer might test different portions of an application's code against different inputs (e.g., unit testing). As another example, a developer might reason about execution of an application's code in a debugger (e.g., by setting breakpoints/watchpoints, by stepping through lines of code, etc. as the code executes). As another example, a developer might observe code execution behaviors (e.g., timing, coverage) in a profiler. As another example, a developer might insert diagnostic code (e.g., trace statements) into the application's code.

While conventional diagnostic tools (e.g., debuggers, profilers, etc.) have operated on "live" forward-executing code, an emerging form of diagnostic tools enable "historic" debugging (also referred to as "time travel" or "reverse" debugging), in which the execution of at least a portion of a program's thread(s) is recorded into one or more trace files (i.e., an execution trace). Using some tracing techniques, an execution trace can contain "bit-accurate" historic execution trace data, which enables the recorded portion(s) the traced thread(s) to be virtually "replayed" (e.g., via emulation) down to the granularity of individual instructions (e.g., machine code instructions, intermediate language code instructions, etc.). Thus, using "bit-accurate" trace data, diagnostic tools can enable developers to reason about a recorded prior execution of subject code, as opposed to a "live" forward execution of that code. For example, using execution traces, a historic debugger might provide user experiences that enable both forward and reverse breakpoints/watchpoints, that enable code to be stepped through both forwards and backwards, etc. A historic profiler, on the other hand, might be able to derive code execution behaviors (e.g., timing, coverage) from prior-executed code.

Since modern microprocessors commonly execute at the rate of tens- to hundreds-of thousands of MIPS (millions of instructions per second), execution traces can capture vast amounts of information, even if the capture mere fractions of a second of a thread's execution. As such, analyzing and presenting information about execution traces can present significant technical hurdles.

BRIEF SUMMARY

At least some embodiments described herein diff replayable execution traces. This can include diffing a single subject execution trace against a single comparison execution trace (e.g., 1:1), diffing a single subject execution trace against a plurality of comparison execution traces (e.g., 1:N), and/or diffing a plurality of subject execution traces against a plurality of comparison execution traces (e.g., M:N). The embodiments herein operate by grouping sequences of related executable instructions, and performing diffing based on attributes of those groups to determine if the groups executed equivalently, even if the particular instructions in those groups differed. Thus, the embodiments herein can diff sets of traced instructions, even where those instructions executed from applications having different binaries (e.g., due code changes, compiler changes, compiler settings changes, processor Instruction Set Architecture (ISA) changes, and the like). In addition, the embodiments herein can diff different sections of traced instructions at different levels of detail, enabling processing resources to be devoted to those areas of particular interest.

Additional embodiments described herein perform tree-based diffing of replayable execution traces. This tree-based diffing is based on creating call trees for different traces, and then creating a differencing tree from those call trees. Each node in the differencing tree characterizes a difference, or equality, between the call trees. Each node in the differencing tree also represents a differencing cost of that node, together with the total differencing costs of any descendant nodes. These differencing costs are used to identify a difference between the traces used to create the call trees. In addition, some embodiments can match subject and comparison traces, or portions thereof, based on similarities in the work that was being performed by the entities represented by those traces.

In some embodiments, methods, systems, and computer program products for diffing a subject replayable execution trace against a comparison replayable execution trace access a first subject replayable execution trace which represents a first sequence of executable instructions that executed as part of a first executing entity, and a second comparison replayable execution trace which represents a second sequence of executable instructions that executed as part of a second executing entity. These embodiments also identify a first plurality of functions within the first sequence of executable instructions, and a second plurality of functions within the second sequence of executable instructions. Each function corresponds to a sequence of one or more executable instructions that executed as part of the function. These embodiments also identify a first plurality of groups of the first plurality of functions, and a second plurality of groups of the second plurality of functions. Each group comprises a sequence of one or more related functions. These embodiments also compare the first plurality of groups and the second plurality of groups. The comparison includes determining, based on an identity of each group and on one or more functions corresponding to the group, if each first group in the first plurality of groups is at least one of equal to a second group in the second plurality of groups, a replacement of a second group in the second plurality of groups, deleted from the second plurality of groups, or inserted into the second plurality of groups. These embodiments also provide one or more indicia of a result of the comparing to a software component at the computer system, or to another computer system. The indicia indicate whether each first group is at least one of equal to a second group in the second plurality of groups, a replacement of a second group in the second plurality of groups, deleted from the second plurality of groups, or inserted into the second plurality of groups.

In other embodiments, methods, systems, and computer program products for diffing a subject replayable execution trace against a plurality of comparison replayable execution traces access a subject replayable execution trace, and a plurality of comparison replayable execution traces. Each replayable execution trace represents a corresponding sequence of executable instructions that executed as part of a corresponding executing entity. These embodiments also identify a set of mappings among the plurality of comparison replayable execution traces. Each mapping identifies two or more corresponding comparison sections of consecutive executable instructions within the plurality of comparison replayable execution traces that execute equivalently. Each comparison section in each mapping is from a different one of the plurality of comparison replayable execution traces. Based on the set of mappings, these embodiments also identify a plurality of distinct comparison sections within the plurality of comparison replayable execution traces. Each distinct comparison section either (i) lacks a mapping in the set of mappings, or (ii) is a representative comparison section from a different mapping in the set of mappings. These embodiments also compare the subject replayable execution trace and the plurality of comparison replayable execution traces. The comparing includes comparing each of a plurality of subject sections of consecutive executable instructions within the subject execution trace against one or more of the plurality of distinct comparison sections. Based on the comparing, these embodiments also determine a comparison status of each of the plurality of subject sections. The determining includes determining at least one of whether each subject section is (i) equal to at least one corresponding distinct comparison section, or (ii) different than the plurality of distinct comparison sections. The determined comparison status of at least one particular subject section with respect at least one particular corresponding distinct comparison section is applied to each additional comparison section to which the at least one particular distinct comparison section is mapped in the set of mappings. These embodiments also provide an indicia of a result of the determining to a software component at the computer system, or to another computer system.

In yet other embodiments, methods, systems, and computer program products for diffing a plurality of subject replayable execution traces against a plurality of comparison replayable execution traces access a plurality of subject replayable execution traces, and a plurality of comparison replayable execution traces. Each replayable execution trace represents a corresponding sequence of executable instructions that executed as part of a corresponding executing entity. For the plurality of subject replayable execution traces, these embodiments identify a first set of mappings among the plurality of subject replayable execution traces and, based on the first set of mappings, and identify a plurality of distinct subject sections within the plurality of subject replayable execution traces. Each mapping of the first set of mappings identifies two or more corresponding subject sections of consecutive executable instructions within the plurality of subject replayable execution traces that execute equivalently, and each subject section in each mapping is from a different one of the plurality of subject replayable execution traces. Each distinct subject section either (i) lacks a mapping in the first set of mappings, or (ii) is a representative subject section from a different mapping in the first set of mappings. For the plurality of comparison replayable execution traces, these embodiments identify a second set of mappings among the plurality of comparison replayable execution traces and, based on the second set of mappings, identify a plurality of distinct comparison sections within the plurality of comparison replayable execution traces. Each mapping of the second set of mappings identifies two or more corresponding comparison sections of consecutive executable instructions within the plurality of comparison replayable execution traces that execute equivalently, and each comparison section in each mapping is from a different one of the plurality of comparison replayable execution traces. Each distinct comparison section either (i) lacks a mapping in the second set of mappings, or (ii) is a representative comparison section from a different mapping in the second set of mappings. These embodiments also compare the plurality of subject replayable execution traces and the plurality of comparison replayable execution traces. The comparing includes comparing each of the plurality of distinct subject sections against one or more of the plurality of distinct comparison sections. Based on the comparing, these embodiments determine a comparison status of each of the plurality of distinct subject sections. The determining includes determining at least one of whether each distinct subject section is (i) equal to at least one corresponding distinct comparison section, or (ii) different than the plurality of distinct comparison sections. The determined comparison status of at least one particular distinct subject section with respect at least one particular corresponding distinct comparison section is applied to (i) each additional comparison section to which the at least one particular distinct comparison section is mapped in the second set of mappings, and to (ii) each additional subject section to which the at least one particular distinct subject section is mapped in the first set of mappings. The embodiments also provide an indicia of a result of the determining to a software component at the computer system, or to another computer system.

In still further embodiments, methods, systems, and computer program products for performing a tree-based diffing of a subject replayable execution trace against a comparison replayable execution trace identify a first subject replayable execution trace which represents a first sequence of executable instructions that executed as part of a first executable entity, and identify a second comparison replayable execution trace which represents a second sequence of executable instructions that executed as part of a second executable entity. These embodiments also identify both a first plurality of function calls within the first sequence of executable instructions and a second plurality of function calls within the second sequence of executable instructions, and create both a first call tree representing the first plurality of function calls and a second call tree representing the second plurality of function calls. Each parent node to child node relationship in the first and second call trees represent a corresponding caller function to callee function relationship. These embodiments also create a differencing tree comprising a plurality of differencing tree nodes that each indicates a corresponding differencing status between the first call tree and the second call tree. The differencing status for each differencing tree node indicates at least one of (i) equality of a corresponding first node in the first call tree and a corresponding second node in the second call tree, (ii) replacement of the first node in the first call tree by the second node in the second call tree, (iii) presence of the first node in the first call tree but not in the second call tree, or (iv) presence of the second node in the second call tree but not in the first call tree. These embodiments also assign a corresponding differencing cost to each of the plurality of differencing tree nodes. The differencing cost for each differencing tree node is based on (i) the differencing status for the differencing tree node, and (ii) an aggregation of differencing costs for descendants of the differencing tree node. Based on assigning a corresponding differencing cost to each of the plurality of differencing tree nodes, these embodiments identify a path to a particular differencing tree node based on following nodes that most contribute to differences between the first and second call trees. Then, based on identifying the particular differencing tree node, these embodiments provide to a software component at the computer system, or to another computer system, one or more indicia of a difference between the first plurality of function calls and the second plurality of function calls.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 1B illustrates an example debugging component that diffs replayable execution traces;

FIG. 4A illustrates two sequences of recorded executable instructions for diffing by a debugging component;

FIG. 4B illustrates groupings of the executable instructions of FIG. 4A into sections of related consecutive executable instructions;

FIG. 4C illustrates further grouping the sections of consecutive executable instructions illustrated in FIG. 4B into higher-level groups;

FIG. 10A illustrates an example of how a queue of tasks might be distributed threads of two thread pools;

FIGS. 10B-10G Illustrate an example of a MergeSort of the tasks shown in the table of FIG. 10A;

DETAILED DESCRIPTION

Figure 1A:
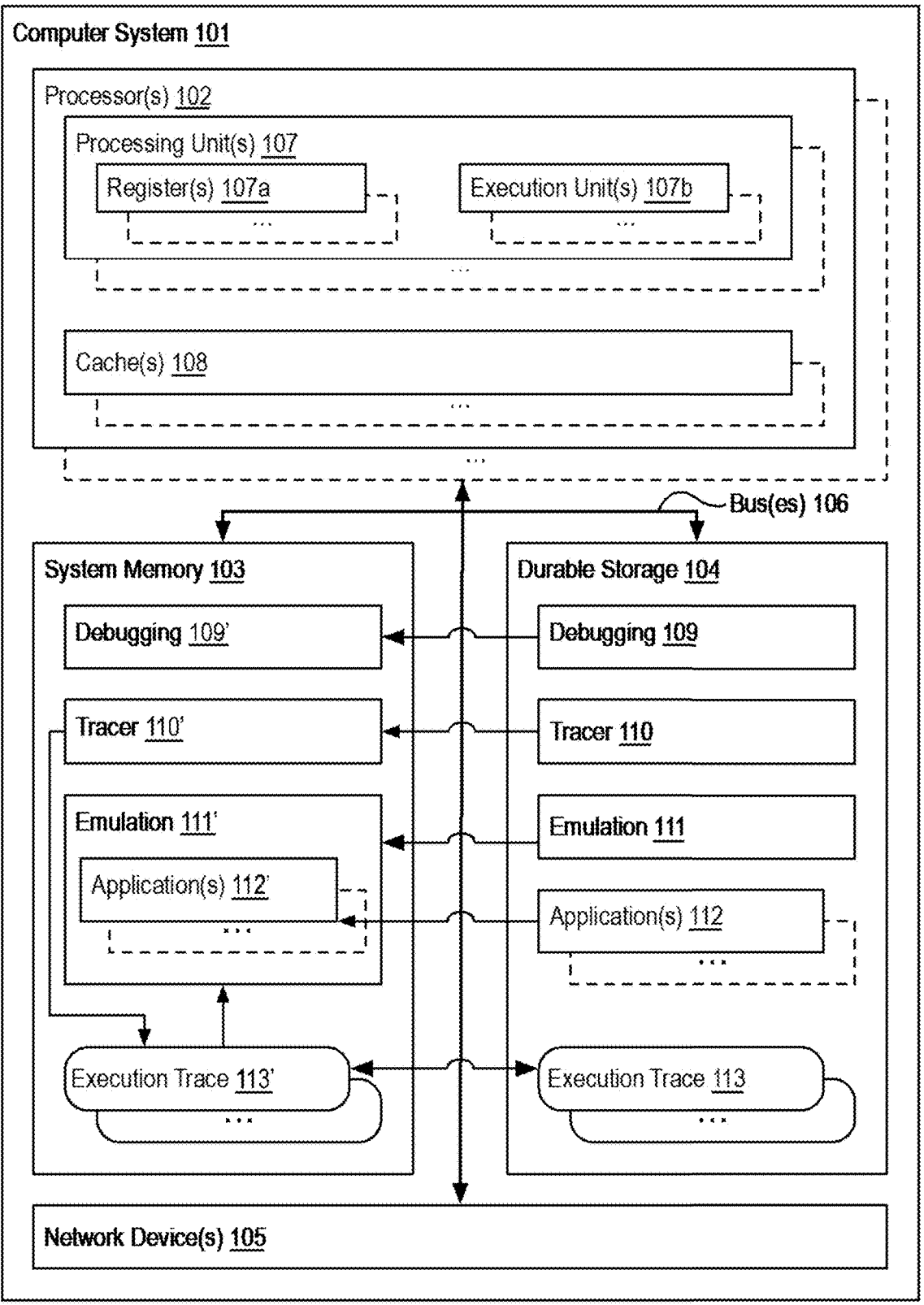
FIG. 1A illustrates an example computing environment that facilitates diffing replayable execution traces.

At least some embodiments described herein diff replayable execution traces. This can include diffing a single subject execution trace against a single comparison execution trace (e.g., 1:1), diffing a single subject execution trace against a plurality of comparison execution traces (e.g., 1:N), and/or diffing a plurality of subject execution traces against a plurality of comparison execution traces (e.g., M:N). The embodiments herein operate by grouping sequences of related executable instructions, and performing diffing based on attributes of those groups to determine if the groups executed equivalently, even if the particular instructions in those groups differed. Thus, the embodiments herein can diff sets of traced instructions, even where those instructions executed from applications having different binaries (e.g., due code changes, compiler changes, compiler settings changes, processor ISA changes, and the like). In addition, the embodiments herein can diff different sections of traced instructions at different levels of detail, enabling processing resources to be devoted to those areas of particular interest.

Additional embodiments described herein perform tree-based diffing of replayable execution traces. This tree-based diffing is based on creating call trees for different traces, and then creating a differencing tree from those call trees. Each node in the differencing tree characterizes a difference, or equality, between the call trees. Each node in the differencing tree also represents a differencing cost of that node, together with the total differencing costs of any descendant nodes. These differencing costs are used to identify a difference between the traces used to create the call trees. In addition, some embodiments can match subject and comparison traces, or portions thereof, based on similarities in the work that was being performed by the entities represented by those traces.

An execution trace used by the embodiments herein might be generated by a variety of historic debugging technologies. In general, historic debugging technologies record or reconstruct the execution state of an entity at various times, in order to enable execution of that entity to be at least partially re-executed or emulated later from that execution state. The fidelity of that virtual execution varies depending on what traced execution state is available.

For example, one class of historic debugging technologies, referred to herein as time-travel debugging, continuously records a bit-accurate trace of an entity's execution. This bit-accurate trace can then be used later to faithfully replay that entity's prior execution down to the fidelity of individual code instructions. For example, a bit-accurate trace might record information sufficient to reproduce initial processor state for at least one point in a thread's prior execution (e.g., by recording a snapshot of processor registers), along with the data values that were read by the thread's instructions as they executed after that point in time (e.g., the memory reads). This bit-accurate trace can then be used to replay execution of the thread's code instructions (starting with the initial processor state) based on supplying the instructions with the recorded reads.

Another class of historic debugging technology, referred to herein as branch trace debugging, relies on reconstructing at least part of an entity's execution state based on working backwards from a dump or snapshot (e.g., a crash dump of a thread) that includes a processor branch trace (i.e., which includes a record of whether or not branches were taken). These technologies start with values (e.g., memory and register) from this dump or snapshot and, using the branch trace to at least partially determine code execution flow, iteratively replay the entity's code instructions and backwards and forwards in order to reconstruct intermediary data values (e.g., register and memory) used by this code until those values reach a steady state. These techniques may be limited in how far back they can reconstruct data values, and how many data values can be reconstructed. Nonetheless, the reconstructed historical execution data can be used for historic debugging.

Yet another class of historic debugging technology, referred to herein as replay and snapshot debugging, periodically records full snapshots of an entity's memory space and processor registers while it executes. If the entity relies on data from sources other than the entity's own memory, or from a non-deterministic source, these technologies might also record such data along with the snapshots. These technologies then use the data in the snapshots to replay the execution of the entity's code between snapshots.

FIG. 1A illustrates an example computing environment 100 that facilitates diffing replayable execution traces. As depicted, computing environment 100 may comprise or utilize a special-purpose or general-purpose computer system 101, which includes computer hardware, such as, for example, one or more processors 102, system memory 103, durable storage 104, and/or network device(s) 105, which are communicatively coupled using one or more communications buses 106.

Embodiments within the scope of the present invention can include physical and other computer-readable media for carrying or storing computer-executable instructions and/or data structures. Such computer-readable media can be any available media that can be accessed by a general-purpose or special-purpose computer system. Computer-readable media that store computer-executable instructions and/or data structures are computer storage media. Computer-readable media that carry computer-executable instructions and/or data structures are transmission media. Thus, by way of example, and not limitation, embodiments of the invention can comprise at least two distinctly different kinds of computer-readable media: computer storage media and transmission media.

Computer storage media are physical storage media (e.g., system memory 103 and/or durable storage 104) that store computer-executable instructions and/or data structures. Physical storage media include computer hardware, such as RAM, ROM, EEPROM, solid state drives ("SSDs"), flash memory, phase-change memory ("PCM"), optical disk storage, magnetic disk storage or other magnetic storage devices, or any other hardware storage device(s) which can be used to store program code in the form of computer-executable instructions or data structures, which can be accessed and executed by a general-purpose or special-purpose computer system to implement the disclosed functionality of the invention.

Transmission media can include a network and/or data links which can be used to carry program code in the form of computer-executable instructions or data structures, and which can be accessed by a general-purpose or special-purpose computer system. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer system, the computer system may view the connection as transmission media. Combinations of the above should also be included within the scope of computer-readable media.

Further, upon reaching various computer system components, program code in the form of computer-executable instructions or data structures can be transferred automatically from transmission media to computer storage media (or vice versa). For example, computer-executable instructions or data structures received over a network or data link can be buffered in RAM within a network interface module (e.g., network device(s) 105), and then eventually transferred to computer system RAM (e.g., system memory 103) and/or to less volatile computer storage media (e.g., durable storage 104) at the computer system. Thus, it should be understood that computer storage media can be included in computer system components that also (or even primarily) utilize transmission media.

Computer-executable instructions comprise, for example, instructions and data which, when executed at one or more processors, cause a general-purpose computer system, special-purpose computer system, or special-purpose processing device to perform a certain function or group of functions. Computer-executable instructions may be, for example, machine code instructions (e.g., binaries), intermediate format instructions such as assembly language, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The invention may also be practiced in distributed system environments where local and remote computer systems, which are linked (either by hardwired data links, wireless data links, or by a combination of hardwired and wireless data links) through a network, both perform tasks. As such, in a distributed system environment, a computer system may include a plurality of constituent computer systems. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

A cloud computing model can be composed of various characteristics, such as on-demand self-service, broad network access, resource pooling, rapid elasticity, measured service, and so forth. A cloud computing model may also come in the form of various service models such as, for example, Software as a Service ("SaaS"), Platform as a Service ("PaaS"), and Infrastructure as a Service ("IaaS"). The cloud computing model may also be deployed using different deployment models such as private cloud, community cloud, public cloud, hybrid cloud, and so forth.

Some embodiments, such as a cloud computing environment, may comprise a system that includes one or more hosts that are each capable of running one or more virtual machines. During operation, virtual machines emulate an operational computing system, supporting an operating system and perhaps one or more other applications as well. In some embodiments, each host includes a hypervisor that emulates virtual resources for the virtual machines using physical resources that are abstracted from view of the virtual machines. The hypervisor also provides proper isolation between the virtual machines. Thus, from the perspective of any given virtual machine, the hypervisor provides the illusion that the virtual machine is interfacing with a physical resource, even though the virtual machine only interfaces with the appearance (e.g., a virtual resource) of a physical resource. Examples of physical resources including processing capacity, memory, disk space, network bandwidth, media drives, and so forth.

As shown in FIG. 1A, each processor 102 can include (among other things) one or more processing units 107 (e.g., processor cores) and one or more caches 108. Each processing unit 107 loads and executes machine code instructions via the caches 108. During execution of these machine code instructions at one more execution units 107b, the instructions can use internal processor registers 107a as temporary storage locations and can read and write to various locations in system memory 103 via the caches 108. In general, the caches 108 temporarily cache portions of system memory 103; for example, caches 108 might include a "code" portion that caches portions of system memory 103 storing application code, and a "data" portion that caches portions of system memory 103 storing application runtime data. If a processing unit 107 requires data (e.g., code or application runtime data) not already stored in the caches 108, then the processing unit 107 can initiate a "cache miss," causing the needed data to be fetched from system memory 103—while potentially "evicting" some other data from the caches 108 back to system memory 103.

As illustrated, the durable storage 104 can store computer-executable instructions and/or data structures representing executable software components; correspondingly, during execution of this software at the processor(s) 102, one or more portions of these computer-executable instructions and/or data structures can be loaded into system memory 103. For example, the durable storage 104 is shown as potentially storing computer-executable instructions and/or data structures corresponding to a debugging component 109, a tracer component 110, an emulation component 111, and one or more application(s) 112. The durable storage 104 can also store data, such as at least one execution trace 113 (e.g., generated using one or more of the historic debugging technologies described above).

In general, the debugging component 109 leverages the emulation component 111 in order to emulate execution of code of executable entities, such as application(s) 112, based on execution state data obtained from at least one execution trace 113. Thus, FIG. 1A shows that the debugging component 109 and the emulation component 111 are loaded into system memory 103 (i.e., debugging component 109' and emulation component 111'), and that the application(s) 112 are being emulated within the emulation component 111' (i.e., application(s) 112'). As will be explained in more detail in connection with FIG. 1B, the debugging component 109 can provide functionality for diffing replayable execution traces. The debugging component 109 can correspond to any type of tool that consumes an execution trace 113 as part of analyzing a prior execution of an application 112. For instance, the debugging component 109 might be a debugger, a profiler, a cloud service, etc.

In general, the tracer component 110 records or "traces" execution of one or more of application(s) 112 into at least one execution trace 113 (e.g., using one or more types of the historic debugging technologies described above). The tracer component 110 can record execution of application(s) 112 whether that execution be a "live" execution on the processor(s) 102 directly, whether that execution be a "live" execution on the processor(s) 102 via a managed runtime, and/or whether that execution be an emulated execution via the emulation component 111. Thus, FIG. 1A also shows that the tracer component 110 is also loaded into system memory 103 (i.e., tracer component 110'). An arrow between tracer component 110' and execution trace 113' indicates that the tracer component 110' can record trace data into execution trace 113' (which might then be persisted to the durable storage 104 as execution trace 113).

Figure 2:
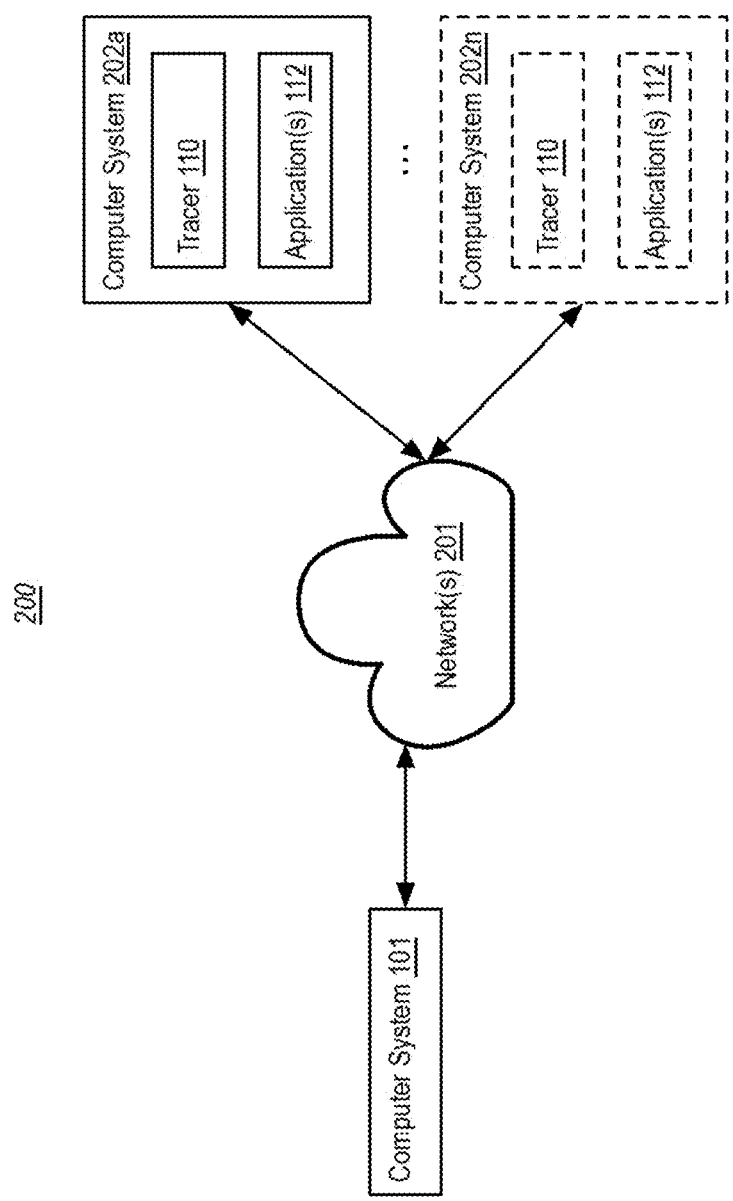
FIG. 2 illustrates an example computing environment in which the computer system of FIG. 1A is connected to one or more other computer systems over one or more networks.

Computer system 101 might additionally, or alternatively, receive at least one execution trace 113 from another computer system (e.g., using network device(s) 105). For example, FIG. 2 illustrates an example computing environment 200 in which computer system 101 of FIG. 1A is connected to one or more other computer systems 202 (i.e., computer systems 202a-202n) over one or more networks 201. As shown in example 200, each computer system 202 includes a tracer component 110 and application(s) 112. As such, computer system 101 may receive, over the network(s)

201, at least one execution trace 113 of at least one prior execution of one or more of application(s) 112 at these computer system(s) 202.

It is noted that, while the debugging component 109, the tracer component 110, and/or the emulation component 111 might each be independent components or applications, they might alternatively be integrated into the same application (such as a debugging suite), or might be integrated into another software component-such as an operating system component, a hypervisor, a cloud fabric, etc. As such, those skilled in the art will also appreciate that the invention may be practiced in a cloud computing environment of which computer system 101 is a part. For instance, while these components 109-111 might take the form of one or more software applications executed at a user's local computer, they might also take the form of a service provided by a cloud computing environment.

It was mentioned previously that the debugging component 109 can provide functionality for diffing replayable execution traces. To demonstrate how the debugging component 109 might accomplish the foregoing, FIG. 1B illustrates additional detail of the debugging component 109 of FIG. 1A. The depicted debugging component 109 in FIG. 1B includes a variety of components (e.g., data access 114, matching 119, grouping 115, alignment 116, diffing 117, output 118, etc.) that represent various functions that the debugging component 109 might implement in accordance with various embodiments described herein. It will be appreciated that the depicted components-including their identity, sub-components, and arrangement—are presented merely as an aid in describing various embodiments of the debugging component 109 described herein, and that these components are non-limiting to how software and/or hardware might implement various embodiments of the debugging component 109 described herein, or of the particular functionality thereof.

Figure 3:
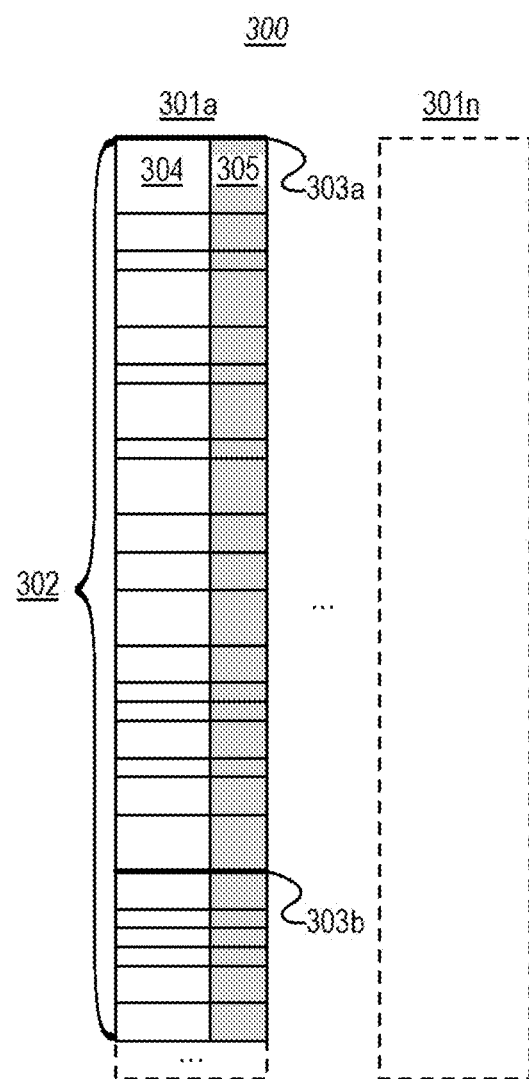
FIG. 3 illustrates an example of a recorded execution of an executable entity.

As shown, the data access component 114 includes a trace access component 114a and a code access component 114b. The trace access component 114a accesses execution traces, such as an execution trace 113 of a prior execution of application 112. FIG. 3 illustrates one example of an execution trace 300 of an executable entity (e.g., application 112) that might be accessed by the trace access component 114a, where the execution trace 300 might have been generated using time-travel debugging technologies. Note that execution trace 300 is one example, only and that traces could take a variety of formats, so long as they provide way to recover each thread from the recording. Notably, the term "thread" should be treated generally herein to refer to any linear execution of code, even if that code were to be dispatched by multiple separate operating system threads.

In the example of FIG. 3, execution trace 300 includes a plurality of data streams 301 (i.e., data streams 301a-301n). In embodiments, each data stream 301 represents execution of a different thread that executed from the code of an application 112. For example, data stream 301a might record execution of a first thread of application 112, while data stream 301n records an $n^{th}$ thread of application 112. As shown, data stream 301a comprises a plurality of data packets 302. Since the particular data logged in each data packet 302 might vary, they are shown as having varying sizes. In general, when using time-travel debugging technologies, a data packet 302 might record the inputs (e.g., register values, memory values, etc.) to one or more executable instructions that executed as part of this first thread of application 112. As shown, data stream 301a might also include one or more key frames 303 (e.g., key frames 303a and 303b) that each records sufficient information, such as a snapshot of register and/or memory values, that enables the prior execution of the thread to be replayed by the emulation component 111, starting at the point of the key frame and proceeding forward.

In embodiments, an execution trace 113 might also include the actual code that was executed as part of an application 112. Thus, in FIG. 3, each data packet 302 is shown as including a non-shaded data inputs portion 304 and a shaded code portion 305. In embodiments, the code portion 305 of each data packet 302, if present, might include the executable instructions that executed based on the corresponding data inputs. In other embodiments, however, an execution trace 113 might omit the actual code that was executed, instead relying on having separate access to the code of the application 112 (e.g., from durable storage 104). In these other embodiments, each data packet may, for example, specify an address or offset to the appropriate executable instruction(s) in an application binary image. Although not shown, it may also be possible that the execution trace 300 includes a data stream 301 that stores one or more of the outputs of code execution. It is noted that used of different data input and code portions of a data packet is for illustrative purposes only, and that the same data could be stored in a variety of manners, such as by the use of multiple data packets.

If there are multiple data streams 301, each recording execution of a different thread, these data streams might include sequencing events. Each sequencing event records the occurrence of an event that is orderable across the threads. For example, sequencing events might correspond to interactions between the threads, such as accesses to memory that is shared by the threads. Thus, for instance, if a first thread that is traced into a first data stream (e.g., 301a) writes to a synchronization variable, a first sequencing event might be recorded into that data stream (e.g., 301a). Later, if a second thread that is traced into a second data stream (e.g., 301b) reads from that synchronization variable, a second sequencing event might be recorded into that data stream (e.g., 301b). These sequencing events might be inherently ordered. For example, each sequencing event might be associated with a monotonically incrementing value, with the monotonically incrementing values defining a total order among the sequencing events. For instance, a first sequencing event recorded into a first data stream might be given a value of one, a second sequencing event recorded into a second data stream might be given a value of two, etc.

Returning to FIG. 1B, the code access component 114b might obtain the code of application 112. If the execution trace(s) 113 obtained by the trace access component 114a included the traced code (e.g., code portion 305), then the code access component 114b might extract that code from an execution trace 113. Alternatively, the code access component 114b might obtain the code of application 112 from the durable storage 104 (e.g., from an application binary image).

The grouping component 115 identifies logical groupings (or sections) of sequences of prior-executed executable instructions whose execution is recorded in the traces accessed by the trace access component 114a. In embodiments, the grouping component 115 takes advantage of the fact that executable code is usually organized into logical structures (e.g., libraries, modules, namespaces, classes, functions, etc.) to identify groupings/sections of consecutive executable instructions that are logically related. For example, a sequence of instructions may belong to a corresponding function, class, module, etc. Since executable code can often be organized hierarchically, in embodiments the grouping component 115 can identify hierarchical arrangements of groupings/sections.

FIGS. 4A-4C illustrate example operation of the grouping component 115. Beginning with FIG. 4A, example 400a symbolically illustrates two sequences of recorded executable instructions for diffing by the debugging component 109, including sequence 401a on the left for comparison/diffing against sequence 401b on the right. These sequences 400 can be sequences of executable instructions that executed as part of one or more executable entities (e.g., process(es) or thread(s) executed from application(s) 112), and whose execution is recorded in corresponding replayable execution traces 113 accessed by the trace access component 114a. For example, sequence 401a might correspond to one or more first portions of execution of a process of an application 112, while sequence 401b might correspond to one or more second portions of execution of a process of the same application 112. In this first example, the first portion(s) of execution might correspond to a first time period of execution of an instance of a process/thread, while the second portion(s) of execution might correspond to a second time period of execution of the same instance of the process/thread. Alternatively, the first portion(s) of execution might correspond to execution of a first instance of a process/thread, while the second portion(s) of execution might correspond to execution of a second instance the process/thread (e.g., at the same computer system, or at another computer system). In another example, sequence 401a might correspond to one or more first portions of execution of a process/thread of one version of an application 112, while sequence 401b might correspond to one or more second portions of execution of a process/thread of another version of the same application 112. In this second example, the applications 112 could be differently versioned due one or more of code changes, compiler changes, compiler settings changes, processor ISA changes, and the like. As will become clear hereinafter, sequences 400 could represent execution an application 112 using the same input data sets/conditions, or entirely different data sets/conditions.

Turning to FIG. 4B, example 400b illustrates that grouping component 115 can group each sequence 400 of executable instructions into different groups/sections of related consecutive executable instructions. In the example 400b, the grouping component 115 initially groups the sequences 400 into sections of executable instructions that executed together as part of a common function. In example 400b, on sequence 401a the grouping component 115 has identified sequences of executable instructions that executed as part of functions 402a, while on sequence 401b the grouping component 115 has identified sequences of executable instructions that executed as part of functions 402b. In example 400b, functions 402 are identified by function name (i.e., a, b, c, etc.) together with function parameters, which are symbolically represented as "( . . . )". Thus, in example 400b, the grouping component 115 has leveraged the logical structure of code to identify groupings/sections of consecutive executable instructions that are logically related as having executed together as a common function.

In embodiments, the grouping component 115 can be flexible when identifying sequences of instructions that executed as a common function. For example, the grouping component 115 might define "functions" to correspond to those functions that were defined in an executable entity's source code. This definition might be particularly useful if debugging symbols are available to the debugging component 109, since function names and parameters are typically identifiable within debugging symbols. However, the grouping component 115 could additionally, or alternatively, more flexibly define a "function" to be any sequence of instructions that executed from a defined starting point to a defined ending point. For example, this could be from entry into a source code function to exit from the source code function, between two tracing events (e.g., Event Tracing for Windows, or similar tracing technology), between different function calls (e.g., openwindow( ) to closewindow( )), from thread start to thread exit, etc. When using a more flexible definition of a function, the grouping component 115 might synthesize function names (e.g., using a counter, by instruction count, by stack frame count, etc.) and identify any inputs consumed by the function's sequence of instructions as the function's parameters. A flexible definition of a function can be utilized both when debugging symbols are available, and when they are not. For example, if debugging symbols are not available of an executable entity, the grouping component 115 might define functions as the entity's exported functions.

As mentioned, in embodiments the grouping component 115 identifies hierarchical arrangements of groupings/sections. Turning to FIG. 4C, example 400c illustrates how grouping component 115 can utilize the hierarchical structure of code to further group the functions 402 illustrated in example 400c into higher-level groups 403. For example, in example 400c, functions 402a are grouped into modules A, B, and K, and functions 402b are grouped into modules A, B, X and K. More particularly, functions 402a are grouped into group 403a-1 comprising a sequence of functions (i.e., a, b, and c) that executed as part of module A, group 403a-2 comprising a sequence of functions (i.e., a, x, and y) that executed as part of module B, group 403a-3 comprising a sequence of functions (i.e., a, z, and x) that executed as part of module A, and group 403a-4 comprising a sequence of functions (i.e., a and b) that executed as part of module K. Similarly, functions 402b are grouped into group 403b-1 comprising a sequence of functions (i.e., a, z, and c) that executed as part of module A, group 403b-2 comprising a sequence of functions (i.e., a, x, and z) that executed as part of module B, group 403b-3 comprising a sequence of functions (i.e., a, z, and x) that executed as part of module X, and group 403b-4 comprising a sequence of functions (i.e., a and b) that executed as part of module K. While example 400c illustrates a two-level hierarchy (i.e., modules and functions), in embodiments the grouping component 115 can create groupings with any number of levels.

FIGS. 4A-4C illustrated two sequences 400 of executable instructions for diffing (i.e., sequence 401a on the left and sequence 401b on the right), including example groupings. In these examples, the debugging component 109 would perform a one-to-one (1:1) diffing (i.e., one sequence of instructions on one side against another sequence of instructions on the other side). In embodiments, the debugging component 109 can might perform one-to-many (1:N) diffing (i.e., one sequence of instructions on one side against N sequences of instructions on the other side) and/or many-to-many (M:N) diffing (i.e., M sequences of instructions on one side against N sequences of instructions on the other side). When performing 1:N or M:N diffing, the debugging component 109 might utilize an alignment component 116, as will be discussed later.

Based at least on the groupings identified by the grouping component 115, the diffing component 117 compares one or more first sequence(s) of instructions against one or more second sequence(s) of instructions to identify commonalities and differences among those instructions. In embodiments, rather than comparing exact sequences of instructions, the diffing component 117 compares the logical groupings of instructions identified by the grouping component 115. Thus, in many ways, the diffing component 117 compares how sequences of executable instructions behaved as a group overall, rather than comparing the exact sequence of instructions that were executed (e.g., instruction-by-instruction). As will be explained, this grouping-based diffing greatly reduces the computational complexity of diffing (e.g., as compared to comparing the exact sequence of instructions that were executed, instruction-by-instruction). In addition, as will also be explained, this grouping-based diffing enables the diffing component 117 to offer new and unique capabilities, such as the ability to compare sequences of executable instructions that executed on entirely different processor ISA's (e.g., a sequence of instructions that executed as part of an x86 build of an application 112 versus a sequence of instructions that executed as part of an ARM build of the application 112).

As shown, the diffing component 117 includes a differencing component 117a which compares different sequences of instructions based on the groupings within those sequences that were identified by the grouping component 115. In embodiments, the differencing component 117a utilizes a metric, such as an edit distance (e.g., Levenshtein distance), to identify how groups in one sequence of instructions compare to groups in another sequence of instructions. In general, an edit distance is a metric measuring the minimum cost of the single-item edit(s) (e.g., insertions, deletions, or replacements) required to transform one sequence into another sequence. For example, Table 1 and Table 2 below present two examples ways for considering edit distance for the character strings FILES and FRIES, in which the individual items being compared are the individual characters in the strings:

TABLE 2

| FILES | Edit | FRIES |
|-------|------|-------|
| F     | =    | F     |
|       | +    | R     |
| I     | =    | I     |
| L     | −    |       |
| E     | =    | E     |
| S     | =    | S     |

TABLE 1

| FILES | Edit | FRIES |
|-------|------|-------|
| F     | =    | F     |
| I     | R    | R     |
| L     | R    | I     |
| E     | =    | E     |
| S     | =    | S     |

In both tables, the "F", "E", and "S" characters can be considered to be equal (=) between the two strings. In Table 1, however, the second and third characters in FILES are considered to be replaced (R) by the second and third characters in FRIES—i.e., the "I" and "L" characters in FILES are replaced with the "R" and "I" characters in FIRES, respectively. In Table 2, on the other hand, the "R" character in FRIES is considered to be an insertion (+), while the "L" character in FILES is considered to be a deletion (−). Thus, in Table 2, the "I" character is considered equal between the two strings.

A decision for whether the edits in Table 1, or the edits in Table 2, are the "minimum" edit distance between the two strings depends on how each edit is weighted. For example, if equal/equivalent characters are given a weight of 0, if additions and deletions are each given a weight of 2, and if replacements are given a weight of 1 (i.e., replacements are preferred over additions and deletions), then the edits of Table 1 would be chosen. This is because the edit distance for Table 1 would be 2, while the edit distance for Table 2 would be 4, and thus Table 1 has the lesser edit distance. If, on the other hand, additions and deletions are instead each given a weight of 1, and replacements are instead given a weight of 2 (i.e., additions and deletions are preferred over replacements), then the edits of Table 2 would be chosen. This is because the edit distance for Table 1 would be 4, while the edit distance for Table 2 would be 2, and thus Table 2 has the lesser edit distance.

In embodiments, the differencing component 117a applies one or more of the following properties to edit distances:
1. $d(x, x)=0$; i.e., the edit distance between equal/equivalent items is zero.
2. $d(x, y)=d(y, x)$; i.e., the edit difference between two items is the same regardless of the direction of the comparison. For example, computing an edit difference between FILES and FRIES would produce the same value as computing an edit difference between FRIES and FILES.
3. $d(a, b)+d(b, c)>=d(a, c)$; i.e., the edit distance between a first item and a second item, plus the edit distance between the second item and a third item is equal to, or greater than, the edit distance between the first and third items.

In some situations, the differencing component 117a might relax the second requirement. In these situations, the values computed by the differencing component 117a might not be strictly considered an "edit distance." However, by relaxing the second requirement, the differencing component 117a could, for instance, consider additions to be more expensive than deletions (i.e., such that deletions are preferred over additions). When applying edit distances to code traces, this could mean that adding a behavior (e.g., a regression) could be considered more expensive than removing a behavior (e.g., a regression).

As mentioned, the differencing component 117a can perform diffing based on groups identified by the grouping component 115, rather than diffing instruction streams instruction-by-instruction, which can greatly reduce the computational complexity of the diffing. For instance, if the differencing component 117a treated each instruction in sequences 401a and 401b as individual items for comparison (e.g., much like the individual characters in the examples above), and computed edit distances between these instructions using standard techniques, the algorithm complexity would be $O(Y*Z)$ (using the well-known "Big-O" algorithm complexity notation and the standard implementation of the algorithm), where Y and Z are the number of instructions in each sequence 401 being compared. By limiting a search depth such that only instruction streams that are similar to within a threshold can be successfully compared, this complexity could potentially be improved to $O(Y+Z)+d$, where d dictates the threshold. Since, as mentioned, modern microprocessors commonly execute at the rate of tens- to hundreds-of thousands of MIPS, traces covering mere seconds of execution time can record the execution of many billions of instructions. As such, diffing on an individual instruction basis can quickly become prohibitively expensive in terms of the computing resources and time required. However, by diffing based on groups, the analysis can instead diff groups of instructions together, eliminating the need to fully compare individual instructions across the traces. In addition, performing diffing based on groups provides opportunities to be intelligently selective as to which the portion(s) of the sequences 401 are actually compared, and at what level of granularity, further reducing the amount of work that may need to be performed. As such, it may be that the techniques herein analyze/compare a mere fraction of the amount of trace data, as compared to an instruction-by-instruction diffing.

In embodiments, the differencing component 117a performs diffing based on groups by representing those groups in an object notation for which edit distance can be applied. When there is a hierarchy of groups, the differencing component 117a might perform this differencing at any level of grouping. To demonstrate these concepts FIGS. 5A-5D illustrate example operation of the differencing component 117a to compare the groups 403 from example 400c of FIG. 4C. Beginning with FIG. 5A, example 500a shows example string-based differencing notations for each group 403 from FIG. 4C. In example 500a, each group 403 is represented as a string comprising a module name, a name of the entry function for the module, and a name of exit function for the module, each separated by an exclamation point (!). Thus, in sequence 401a, group 403a-1 is represented by the string "A!a!c", group 403a-2 is represented by the string "B!a!y", group 403a-3 is represented by the string "A!a!x", and group 403a-4 is represented by the string "K!a!b". In sequence 401b, group 403b-1 is represented by the string "A!a!c", group 403b-2 is represented by the string "B!a!z", group 403b-3 is represented by the string "X!a!x", and group 403b-4 is represented by the string "K!a!b". Notably, the notation used in example 500a is one example only, and it will be appreciated that a great variety of notations could be used. For example, group 403a-1 might alternatively be represented as the string "A!a:c", the string "A:a>c", the string "A:a:c", the string "A:a,c", etc. while capturing the same information.

Based on these group representations, the differencing component 117a determines, as between sequences 401a and 401b, whether a group 403 in one sequence 401 is equal to a corresponding group 403 in the other sequence 401, whether a group 403 is inserted/added in one sequence 401 as compared to the other sequence 401, whether a group 403 is deleted/subtracted in one sequence 401 as compared to the other sequence 401, or whether a group 403 in one sequence 401 is a replacement of a corresponding group 403 in the other sequence 401. In this context, "equal" groups can include not only groups that executed exactly the same (i.e., the sequence of instructions in each group are identical), but also groups that executed equivalently-even if the precise sequences of instructions executed in each group differ. Thus, two groups of instructions can be considered "equal" (or "equivalent") even if those instructions were from different processor ISAs, were from different builds/versions of an application, etc.

Figure 5A:
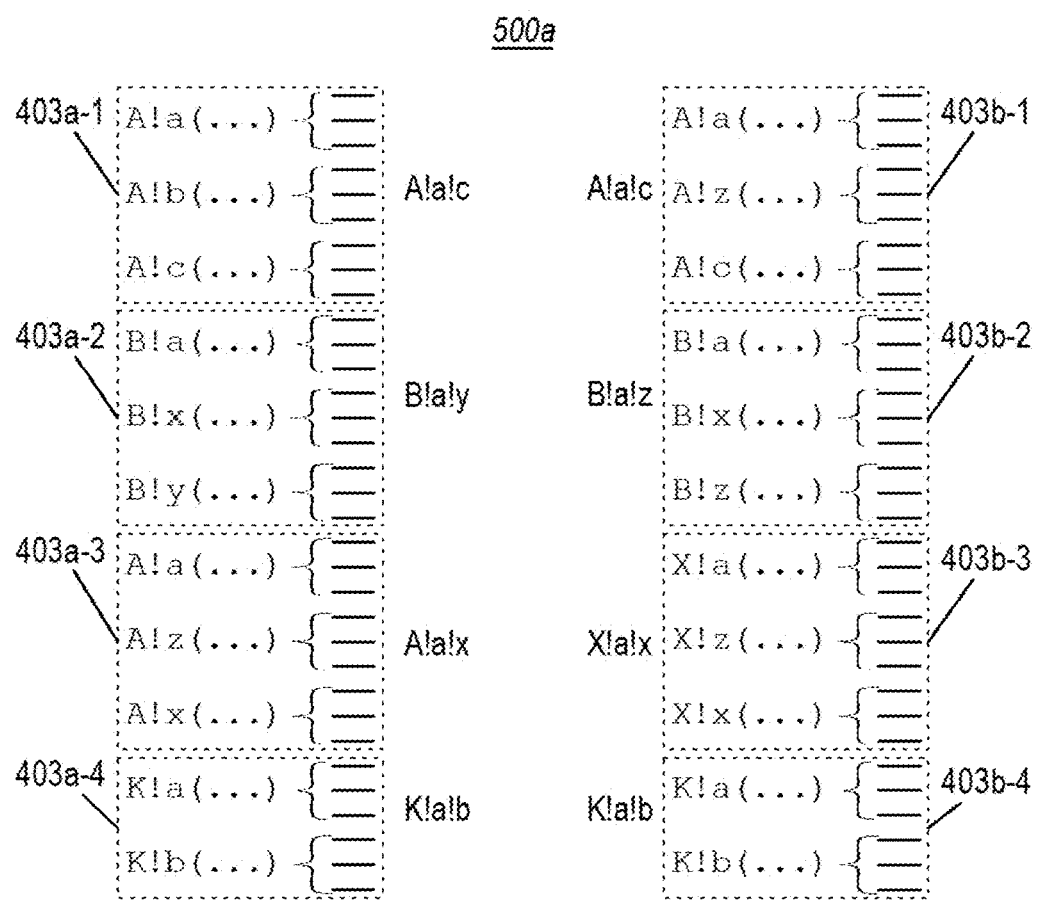
FIG. 5A illustrates an example differencing notation for the higher-level groups of FIG. 4C.
Figure 5B:
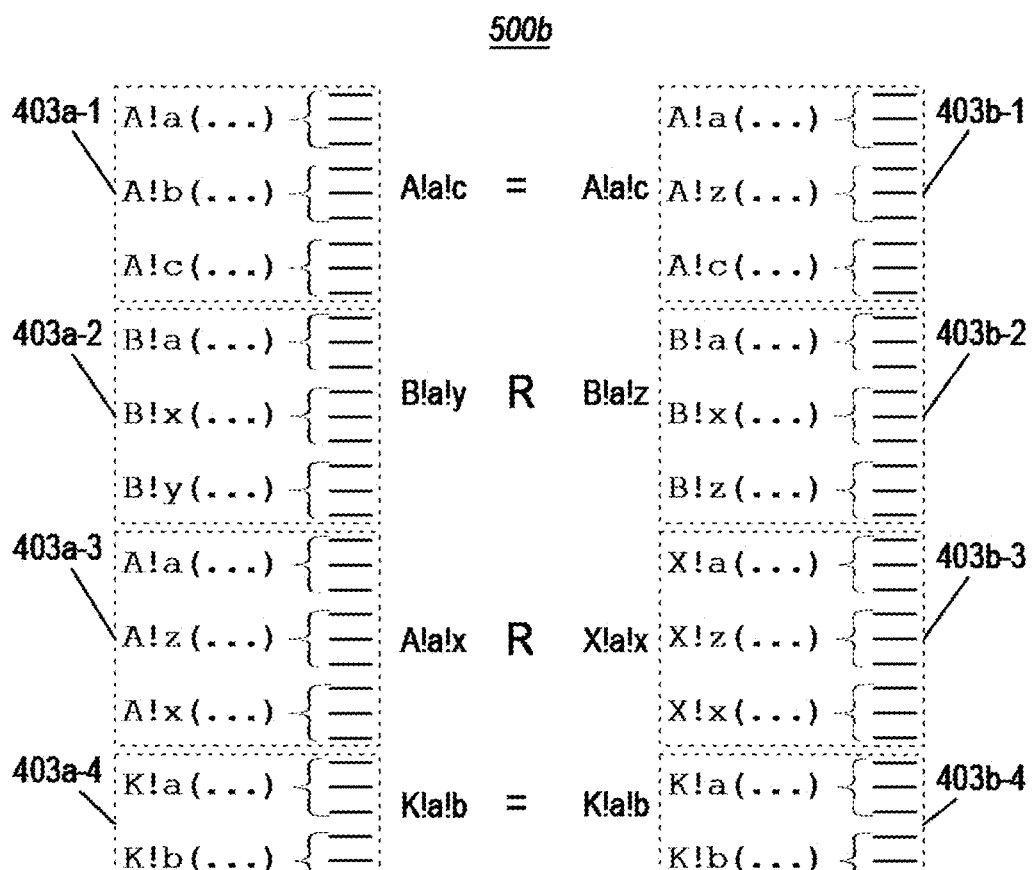
FIG. 5B illustrates an example of group comparison status based on the differencing notations of FIG. 5A.

Turning to FIG. 5B, example 500b illustrates example group comparison status based on these differencing notations. In particular, example 500b shows that the differencing component 117a might determine that—at least when differencing at the level of groups 403—group 403a-1 on sequence 401a is equal (equivalent) to group 403b-1 on sequence 401b, group 403a-2 on sequence 401a is replaced by group 403b-2 on sequence 401b, group 403a-3 on sequence 401a is replaced by group 403b-3 on sequence 401b, and group 403a-3 on sequence 401a is equal (equivalent) to group 403b-4 on sequence 401b. In this example, the differencing component 117a might have weighted replacements as being preferred over insertions and deletions. Since the differencing component 117a has compared a notational representation of the groups, rather than the sequences of individual instructions in the groups, this comparison can take a fraction of the computing resources than would be needed to compare the sequences of individual instructions.

As will be recognized by one of ordinary skill in the art, the foregoing determination of equality/equivalency (e.g., between groups 403a-1 and 403b-1 and groups 401a-4 and 403b-4) only indicates that each set of groups began by executing the same module and function (i.e., A!a) and ended by executing the same module and function (i.e., A!c). While this may be an imprecise indication of equality/equivalency (e.g., group 403a-1 also executed function b, while group 403b-1 instead executed function z), due to the structured nature of program code an indication of this level of equality/equivalency may be sufficient to provide a behavioral overview of how one trace of an application 112 compares to another trace of the application 112. For instance, even though groups 403a-1 and 403b-1 may have diverged somewhat internally, they started with the same function (i.e., A!a) and ended with the same function (i.e., A!c). When presenting an overview of program execution flow, particularly as higher levels of granularity such as at a module level, this may be sufficient to convey behavioral similarities and differences. For example, if module A is a memory allocation library, in both instances the module may have been called (e.g., using an exported function, a) with a request for a particular amount of memory, and may have exited (e.g., using an internal function, c) with an indication of success and/or with a pointer. Thus, the overall behavior of the module was similar in both traces, even if the particular work performed internally by the module diverged.

In embodiments, the differencing component 117a might also consider data, such as a group's inputs and outputs, when comparing equality/equivalency for two groups. For example, returning to the example of groups 403a-1 and 403b-1, in addition to comparing the group object notations (e.g., the string "A!a!c" for each group), the differencing component 117a might also identify and compare the inputs (if any) and the outputs of the group. For example, the differencing component 117a could identify input memory values read (if any) by the instructions in groups 403a-1 and 403b-1, as well as output memory values written by the instructions in groups 403a-1 and 403b-1. Then, the differencing component 117a can compare these values across the sequences 401. If groups 403a-1 and 403b-1 both read the same input values, and if groups 403a-1 and 403b-1 both wrote the same output values, the differencing component 117a might have a high confidence in a determination of equality/equivalency between these groups based on comparing object notations (e.g., the string "A!a!c" for each group). Note that this may be true even though these groups executed different intermediary functions (e.g., function b in group 403a-1 b versus function z in group 403b-1). This is because groups 403a-1 and 403a-1 both produced the same outputs when given the same inputs, even though the processing utilized by those groups to arrive at those outputs might have diverged.

As mentioned, when there is a hierarchy of groups, the differencing component 117a might perform differencing at any level of grouping. Thus, for example, the comparison status shown in FIG. 5B might be an initial comparison status resulting from a first pass by the differencing component 117a. Based on this initial comparison status, the differencing component 117a might make one or more additional passes using groupings lower in the hierarchy. For example, the differencing component 117a might further compare the sub-groupings within groups 403a-1 and 403b-1 to determine if an initial determination of equality/equivalency was accurate or not. Thus, for instance, the differencing component 117a might compare the individual sequences of functions within those groups. To illustrate, the differencing component 117a might determine that, within groups 403a-1 and 403b-1, function A!a on sequence 401a is equal to function A!a on sequence 401b, function A!b on sequence 401a is replaced by function A!z on sequence 401b, and function A!c on sequence 401a is equal to function A!c on sequence 401b. Since, in this second pass, the differencing component 117a determined that function A!b on sequence 401a was replaced by function A!z on sequence 401b, the differencing component 117a might update the comparison status of groups 403a-1 and 403b-1 to be a replacement, instead of equality/equivalency. Performance of this additional pass for groups 403a-1 and 403b-1 could be triggered in a variety of manners. For example, the differencing component 117a might perform an additional pass on any groups that were initially determined to be equal, in order to verify that status. In another example, the differencing component 117a might perform an additional pass on only groups that are specifically requested by a user.

The examples shown in FIGS. 5A and 5B are only one way in which the differencing component 117a might go about performing a comparison. For example, rather than initially using only the beginning and ending functions in a group as part of the comparison, the differencing component 117a might have used all functions in each group. Thus, for example, the differencing component 117a might have compared the string "A!a!b!c" for group 503a-1 with the string "A!a!z!c" for group 503a-1, might have compared the string "B!a!x!y" for group 503a-2 with the string "B!a!x!z" for group 503a-2, and so on. Additionally, the examples in FIGS. 5A and 5B demonstrated a hierarchy having two levels of groupings of instructions (i.e., modules→functions). However, the grouping component 115 might have instead identified a hierarchy having one or more additional levels of groupings (e.g., modules→classes→functions), and the differencing component 117a might include these additional level(s) as part of its analysis. For instance, the differencing component 117a might make a first pass at a module level, might make a second pass at a class level (for at least a subset of modules), and make a third pass at a function level (for at least a subset of classes). Furthermore, the examples in FIGS. 5A and 5B used only function names as part of the comparison. In embodiments, the differencing component 117a might further include function parameter information as part of the comparison (e.g., parameter name, parameter type, parameter count, etc.). For instance, the notation for representing group 503a-1 might be the string "A!a[height,width]!b[status]" (i.e., using parameter names), the string "A!a[int,int]!b[bool]" (i.e., using parameter types), the string "A!a[2]!b[1]" (i.e., using parameter counts), and the like.

In embodiments, the differencing component 117a applies weightings to different classifications types while making edit distance determinations. For example, the differencing component 117a might weight insertions and deletions differently than replacements, and might even weight insertions differently than deletions. In embodiments, the differencing component 117a might also apply different weights to different components of a group's identification object. For example, when representing groups using strings of the form module!entry!exit, the differencing component 117a could compare individual components of those strings (e.g., module to module, entry function to entry function, and exit function to exit function), and apply different weightings to those components. For instance, the differencing component 117a might assign a greater weight to modules than it does to functions. Then, for example, if the modules for two groups are the same, but there are differences in the functions, this weighting might be used to determine if an edit should be classified as a replacement, or as an insertion/deletion. This weighting could even be applied more granularly, such as to parameter information (e.g., name, type, count, etc.).

In embodiments, the differencing component 117a intelligently adapts to identified differences between the comparison data sets. For example, the diffing component 117 is shown as including a transformation component 117b. In embodiments, the transformation component 117b interoperates with the differencing component 117a to apply one or more transformations based on known changes to at least one instruction sequence prior to computing differences. For example, suppose that, in an updated build of an application, a module, class, function, etc. as globally renamed. While, if performed properly, such a global rename should not affect the execution behavior of the application, this rename could result in the differencing component 117a identifying differences which really do not matter from a behavioral standpoint. Thus, the transformation component 117b can apply transformations in order to avoid such "false" differences. Referring to FIG. 5B, for example, group 403a-3 and 403b-3 are shown as having a replacement status. As will be appreciated, this is because the differencing component 117a compared A!a!x against X!a!x. However, if it was known that, in a build of the traced application 112 that was used to generate sequence 401b, module A was renamed to module X, the transformation component 117b might transform the notation for group 403b-3 from X!a!x to A!a!x prior to the differencing component 117a making a comparison. Thus, when performing its analysis after the transformation, the differencing component 117a would classify these groups as being equal, instead of replacements. In this way, the transformation component 117b can help reduce "noise" and focus the identified differences on those that may actually matter from a behavioral standpoint.

In addition to comparing groups based on group identity and edit distance, as has been described, the differencing component 117a can also utilize an emulation comparison component 117c to determine whether or not the sequences of instructions in different functions actually executed equivalently. In embodiments, different sequences of instructions execute equivalently if both sequences of instructions produce the same outputs when given the same inputs. Thus, as part of comparing functions, the emulation comparison component 117c can identify zero or more inputs to each comparison function, and zero or more outputs from the comparison functions. Then, based on supplying the inputs of each comparison function with the code of the other comparison function, the emulation comparison component 117c can emulate that code with the emulation component 111 to determine if there is a code equivalency. In embodiments, the emulation comparison component 117c utilizes one or more of the techniques described in Applicant's co-pending application, U.S. patent application Ser. No. 16/358,221, filed Mar. 19, 2019, and titled "EMULATING NON-TRACED CODE WITH A RECORDED EXECUTION OF TRACED CODE," the entire contents of which are incorporated by reference herein in their entirety.

Figure 5C:
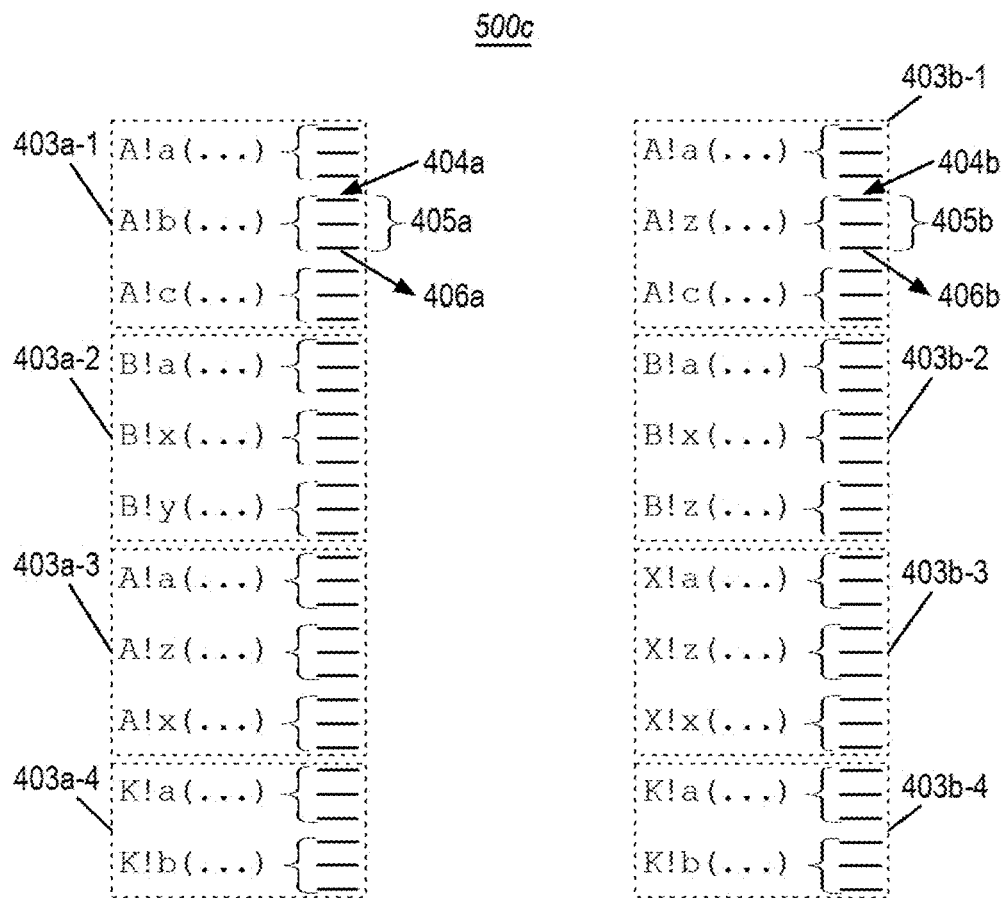
FIG. 5C illustrates an example of utilizing code emulation and inputs/outputs comparison to determine if functions on different traced instruction sequences executed equivalently.
Figure 5D:
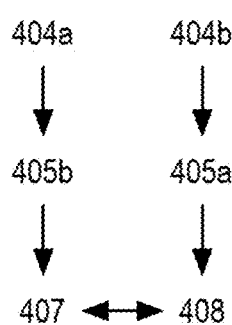
FIG. 5D illustrates an example of utilizing code emulation and inputs/outputs comparison to determine if functions on different traced instruction sequences executed equivalently.

FIGS. 5C and 5D demonstrate operation of the emulation comparison component 117c, based on utilizing code emulation and inputs/outputs comparison to determine if functions on different traced instruction sequences executed equivalently. Referring to FIG. 5C, example 500c shows that, on sequence 401a, the code 405a of function A!b from group 403a-1 has inputs 404a and outputs 406a. In addition, example 500c shows that, on sequence 401b, the code 405b of function A!z from group 403b-1 has inputs 404b and outputs 406b. In order to compare equivalency of code 405a and 405b, the example 500d in FIG. 5D demonstrates that the emulation comparison component 117c can emulate code 405b (i.e., from sequence 401b) using inputs 404a (i.e., from sequence 401a), which will result in some output 407. Example 500d also demonstrates that the emulation comparison component 117c can also emulate code 405a (i.e., from sequence 401a) using inputs 404b (i.e., from sequence 401b), which will result in some output 408. The emulation comparison component 117c can then determine whether outputs 407 and 408 indicate an equivalency between code 405a and 405b. For example, if output 407 is the same as output 406a, and if output 408 is the same as output 406b, then code 405a and 405b execute equivalently. In this situation, the differencing component 117a might determine that function A!b in group 403a-1 and function A!z in group 403a-2 are equivalent to each other (e.g., rather than replacements or insertions/deletions). If output 407 is the not the same as output 406a and/or output 408 is not the same as output 406b, then the code 405a and 405b do not execute equivalently. In this situation, the differencing component 117a might determine that function A!b in group 403a-1 and function A!z in group 403a-2 are not equivalent to each other (e.g., and, thus, are replacements or insertions/deletions).

Notably, the emulation comparison component 117c can determine whether or not different code from different sequences to be equivalent even those sequences were executed on different processor ISA's and/or if those sequences were executed from different builds/versions of an application 112. This is because the emulation comparison component 117c identifies equivalency based on comparing the behavior of sequences of instructions (i.e., how they transformed input data to produce output data), rather than based on comparing the actual instructions executed.

Using the techniques discussed, the emulation comparison component 117c can determine whether or not different portions of code executed equivalently, even if the inputs to that code were not the same. For instance, the emulation comparison component 117c can determine whether or not code 405a and 405b execute equivalently, even if inputs 404a are different than inputs 404b. If inputs are different, then the debugging component 109 might determine why the inputs are different. For example, the debugging component 109 could process each trace backwards to determine where the values of the inputs originated (i.e., where they were written to a memory location used as an input).

The diffing component 117 is also shown as including a transitive analysis component 117d and a ranking/correlation component 117e. In embodiments, these components are utilized when performing 1:N or M:N diffing, and will be discussed later.

The output component 118 can provide one or more indicia of a result of the comparing by the diffing component 117. This can include providing one or more indicia to a software component at computer system 101, or to another computer system (e.g., using network device(s) 105). The indicia can indicate a comparison status determined by the diffing component 117 for one or more groups identified by the grouping component 115. In embodiments, based on an indicia produced by the output component 118, a software component presents a result of the comparing by the diffing component 117 at a user interface. For example, a user interface might provide a side-by-side visual representation of groups on each of sequences 401, indicating where those groups are equal, inserted, deleted, etc. For instance, Table 3 illustrates that the groups in FIG. 5B might be presented side-by-side by aligning equal groups and indicating which groups are replacements. In Table 3, replacements are indicated using parenthesis, though a user interface could provide such indications in a great variety of manners (e.g., colors, shading, bolding, etc.).

TABLE 3

| A!a!c | A!a!c |
|---|---|
| (B!a!y) | (B!a!z) |
| (A!a!x) | (X!a!x) |
| K!a!b | K!a!b |

In embodiments, a user interface might visually apply shifts, as appropriate. For example, suppose that group 403b-3 (i.e., X!a!x) did not exist in any of the illustrated examples. In this instance, the combination of groups 403a-2 (i.e., B!a!y) and 403a-3 (i.e., A!a!x) might together be considered a replacement for group 403b-2 (i.e., B!a!z). Table 4 illustrates that, in this instance, a user interface might visually shift group 403b-4 (i.e., K!a!b) the right side of the presentation down to adapt to this replacement.

TABLE 4

| A!a!c | A!a!c |
|---|---|
| (B!a!y) | (B!a!z) |
| (A!a!x) | |
| K!a!b | K!a!b |

By applying visual shifts in this way, a user interface can enable a user to quickly identify areas in which two sequences 401 executed similarly, and areas in which two sequences 401 they executed differently. In embodiments, to provide a more condensed view, a user interface might provide a capability to visually expand and collapse sections of inequality.

Figure 6:
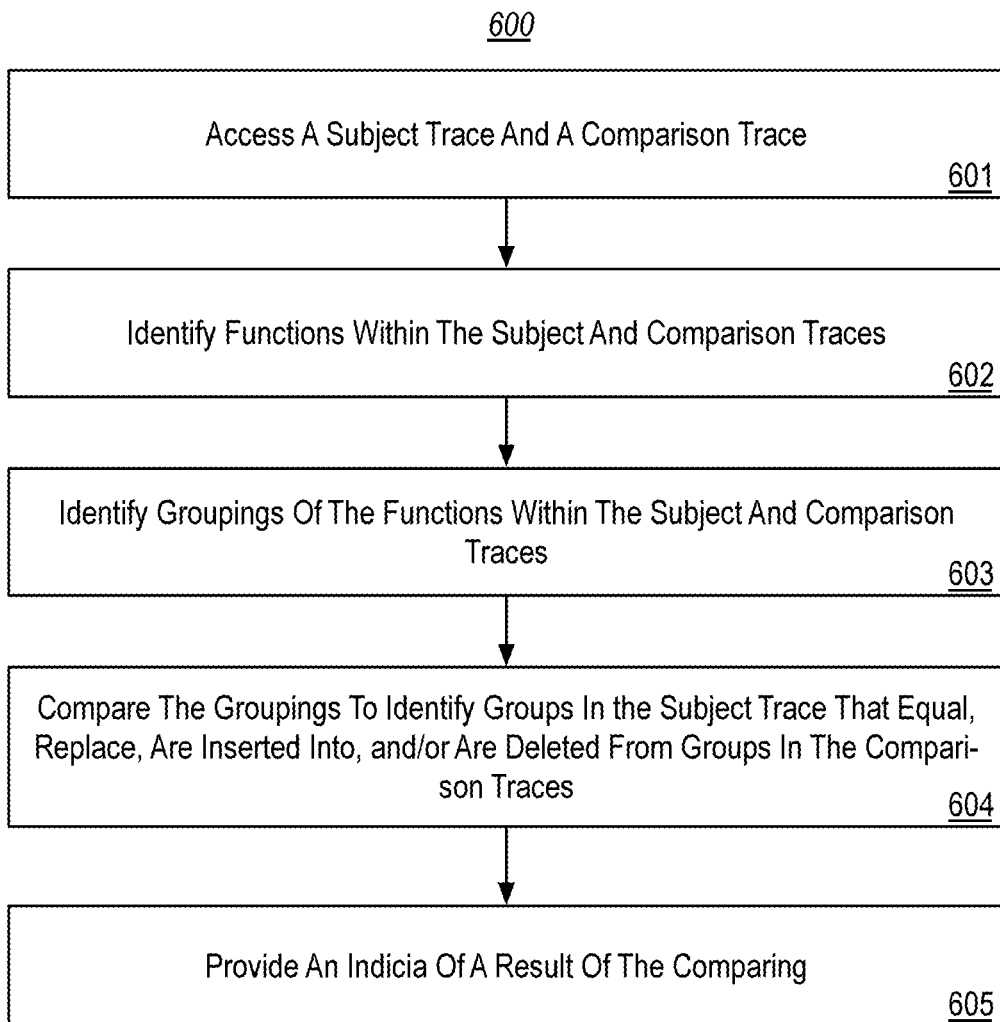
FIG. 6 illustrates a flow chart of an example method for diffing a subject replayable execution trace against a comparison replayable execution trace.

In view of the foregoing discussion of performing a 1:1 execution trace diffing (i.e., one sequence of instructions on one side against another sequence of instructions on the other side) using the debugging component 109, FIG. 6 illustrates a flowchart of an example method 600 for diffing a subject replayable execution trace against a comparison replayable execution trace. Method 600 will now be described within the context of with FIGS. 1-5D. While, for ease in description, the acts of method 600 are shown in a particular sequential order, it will be appreciated that some of these acts might be implemented in different orders, and/or in parallel.

As shown in FIG. 6, method 600 includes an act 601 of accessing a subject trace and a comparison trace. In some embodiments, act 601 comprises accessing a first subject replayable execution trace which represents a first sequence of executable instructions that executed as part of a first executing entity, and accessing a second comparison replayable execution trace which represents a second sequence of executable instructions that executed as part of a second executing entity. For example, the trace access component 114a can access two or more execution traces 113, or two different portions of the same execution trace 113, which record one or more prior executions of an application 112. If there are multiple execution traces 113, the first executing entity and the second executing entity might have executed from common executable code (e.g., the same version of application 112), or from different executable code (e.g., different versions or different builds of application 112). In embodiments, the accessed execution trace(s) 113 represent sequences of executable instructions that were previously executed, and/or can represent sequences of executable instructions that could be executed (i.e., a synthetic trace). Thus, use of the past-tense term "executed" herein can also refer to sequences of instructions that could be executed, even if they did not actually execute previously. For example, FIG. 4A illustrates two sequences of executable instructions—i.e., sequence 401a and sequence 401b. Sequences 401a and 401b might correspond to the accessed first sequence of executable instructions and second sequence of executable instructions, respectively.

Method 600 also includes an act 602 of identifying functions within the subject and comparison traces. In some embodiments, act 602 comprises identifying a first plurality of functions within the first sequence of executable instructions, and identifying a second plurality of functions within the second sequence of executable instructions, each function corresponding to a sequence of one or more executable instructions that executed as part of the function. For example, for each of sequences 401a and 401b, the grouping component 115 can identify groups or sections of consecutive instructions that executed together as a common function. For instance, FIG. 4B illustrates that the grouping component 115 might identify a first plurality of functions 402a on sequence 401a, and second plurality of functions 402a on sequence 401b. In FIG. 4A, these functions 402 are shown as having function names (e.g., a, b, c, etc.) and possibly some function parameters (e.g., indicated as "( . . . )"). As such, as part of act 602, identifying the first plurality of functions and identifying the second plurality of functions might comprise identifying, for each function of the first plurality and second plurality of functions, at least one of a function name, a function parameter name, a function parameter type, or a function parameter count.

Method 600 also includes an act 603 of identifying groupings of the functions within the subject and comparison traces. In some embodiments, act 603 comprises identifying a first plurality of groups of the first plurality of functions, and identifying a second plurality of groups of the second plurality of functions, each group comprising a sequence of one or more related functions. For example, as demonstrated in FIG. 4C, the grouping component 115 could identify groups of functions that are logically related, such as being functions that executed together as a common module. For instance, FIG. 4C illustrates a first plurality of groups 403a-1 through 403a-4 on sequence 401a, and a second plurality of groups 403b-1 through 403b-4 on sequence 401b. While example 400c of FIG. 4C provided groupings based on modules, these groupings could be based on any logical code structure. For example, in act 603, each group might correspond to one of a library, a module, a namespace, or a class; in this case, each related function would have executed as part of the corresponding library, module, namespace, or class. As discussed, the grouping component 115 could identify a hierarchy comprising any number of groups. For instance, if the first and second pluralities of groups corresponded to modules (as in FIG. 4C), then a higher-level group might correspond to libraries, in which each higher-level group comprises a sequence of one or more modules that executed together as part of a common library.

Method 600 also includes an act 604 of comparing the groupings to identify groups in the subject trace that equal, replace, are inserted into, and/or are deleted from groups in the comparison traces. In some embodiments, act 604 comprises comparing the first plurality of groups and the second plurality of groups, including determining, based on an identity of each group and on one or more functions corresponding to the group, if each first group in the first plurality of groups is at least one of equal to a second group in the second plurality of groups; a replacement of a second group in the second plurality of groups; deleted from the second plurality of groups; or inserted into the second plurality of groups. For example, the diffing component 117 can utilize the differencing component 117a to compare groups in the first plurality of groups to groups in the second plurality of groups to classify each first group as having an equal in the second groups, as being a replacement of a second group in the second plurality of groups, as being inserted into the first plurality of groups as compared to the second plurality of groups, or as being deleted from the first plurality of groups as compared to the second plurality of groups. The differencing component 117a could also do a comparison the other way—i.e., by comparing groups in the second plurality of groups to groups in the first plurality of groups to classify each second group as having an equal in the first groups, as being a replacement of a first group in the first plurality of groups, as being inserted into the second plurality of groups as compared to the first plurality of groups, or as being deleted from the second plurality of groups as compared to the first plurality of groups. In embodiments the differencing component 117a computes an "edit distance" for each group, and chooses a combination of single-group edits that produce a minimum overall edit distance between the two pluralities of groups.

In embodiments, comparing the first plurality of groups and the second plurality of groups comprises creating a first plurality of objects each representing one of the first plurality of groups, and creating a second plurality of objects each representing one of the second plurality of groups, each objects identifying the group and one or more corresponding functions of the group, and applying a differencing algorithm between the first plurality of objects and the second plurality of objects. An object could take wide variety of forms, such as a hierarchical structure, a string, etc. In embodiments, an object might separately represent modules, functions, etc., in a manner that enables these individual components to be compared across two different object (e.g., module in object A to module in object B, function in object A to function in object B, etc.), and that enables the individual components to be weighted separately. For simplicity, the examples herein present objects in the form of strings. For example, as demonstrated in FIG. 5A, the differencing component 117a might represent groups by module name and the names of one or more functions that executed as part of the module (e.g., the string A!a!c for group 503a-1, the string B!a!y for group 503a-2, etc.). In this example, each object identifies a group and a plurality of corresponding functions of the group, in which the plurality of corresponding functions ordered in an execution order. Additionally, in this example, each plurality of corresponding functions includes only a first function and a last function that executed in the execution order. Comparing the first plurality of groups and the second plurality of groups might further comprise comparing at least one of a function parameter name, a function parameter type, or a function parameter count. Thus, these objects might also incorporate parameter information. Additionally, when comparing the first plurality of groups and the second plurality of groups, the comparison might weight an identity of each group differently than an identity of at least one function corresponding to the group.

As mentioned, the diffing component 117 might also utilize the transformation component 117b to apply one or more transformations based on known changes to at least one of the comparison instruction sequences prior to computing differences with the differencing component 117a. For instance, there was a global rename in a version of application 112 used to generate sequence 401b as compared to a version of application 112 used to generate sequence 401a, the transformation component 117b might apply transformations to sequence 401b, or data generated therefrom, prior to doing a comparison with the differencing component 117a. Thus, act 604 might include, when comparing the first plurality of groups and the second plurality of groups, applying one or more transformations to at least a subset of at least one of the first replayable execution trace or the second replayable execution trace.

As was also mentioned the diffing component 117 might also utilize the emulation comparison 117c to determine whether the actual instructions in functions on different traces executed equivalently. Thus, act 604 might include determining whether a first function corresponding to a first group of the first plurality of groups executes equivalently to a second function corresponding to a second group of the second plurality of groups. As discussed, the emulation comparison 117c might accomplish such a determination based on using inputs for a function in one sequence of instructions to emulate code from a function in another sequence of instructions, and vice versa, and analyzing the generated outputs. Thus, determining whether the first function (e.g., A!b in group 401a-1) executes equivalently to the second function (e.g., A!z in group 403b-1) might include identifying zero or more first inputs (e.g., inputs 404a) to the first function (e.g., code 405a) and one or more first outputs (e.g., outputs 406a) from the first function, and identifying zero or more second inputs (e.g., inputs 404b) to the second function (e.g., code 405b) and one or more second outputs from the second function (e.g., outputs 406b). The determining might also include replaying the second function (e.g., code 405b) based on supplying the second function with the zero or more first inputs (e.g., inputs 404a) to generate one or more third outputs (e.g., outputs 407), and replaying the first function (e.g., code 405a) based on supplying the first function with the zero or more second inputs (e.g., inputs 404b) to generate one or more fourth outputs (e.g., outputs 408). The determining might also include comparing the first outputs (e.g., outputs 406a) with the third outputs (e.g., outputs 407), and comparing the second outputs (e.g., outputs 406b) with the fourth outputs (e.g., outputs 407).

Method 600 also includes an act 605 of providing an indicia of a result of the comparing. In some embodiments, act 605 comprises providing one or more indicia of a result of the comparing to a software component at the computer system, or to another computer system, the one or more indicia indicating whether each first group is at least one of equal to a second group in the second plurality of groups, a replacement of a second group in the second plurality of groups, deleted from the second plurality of groups, or inserted into the second plurality of groups. For example, the output component 118 can provide an indicia of any of the differencing information produced by the diffing component 117 to a component at computer system 101, or to another computer system (e.g., using network device(s) 105). In embodiments, providing the one or more indicia of the result of the determining causes a software component to present the result of the determining at a user interface. For example, as demonstrated in tables 3 and 4, a user interface might provide a side-by-side visual comparison of two sequences of instructions, based on the groups identified by the grouping component 115 and as compared by the diffing component 117. As mentioned, this could include providing a capability to visually expand and collapse sections of inequality. Thus, presenting the result of the comparing might comprise visually collapsing a sequence of the first plurality of groups that are not equal to second groups in the second plurality of groups.

Figure 7A:
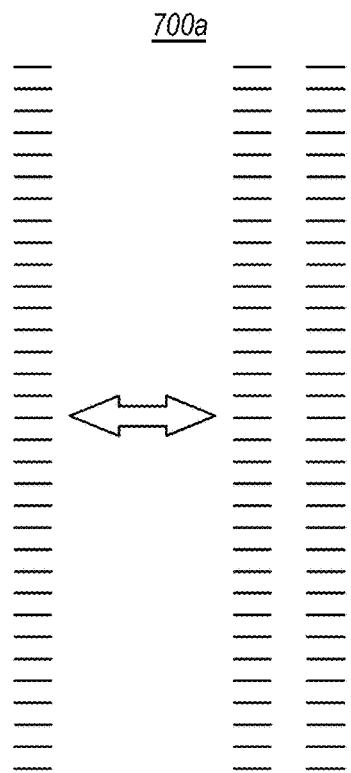
FIG. 7A illustrates an example of one to many (1:N) trace comparison.
Figure 7B:
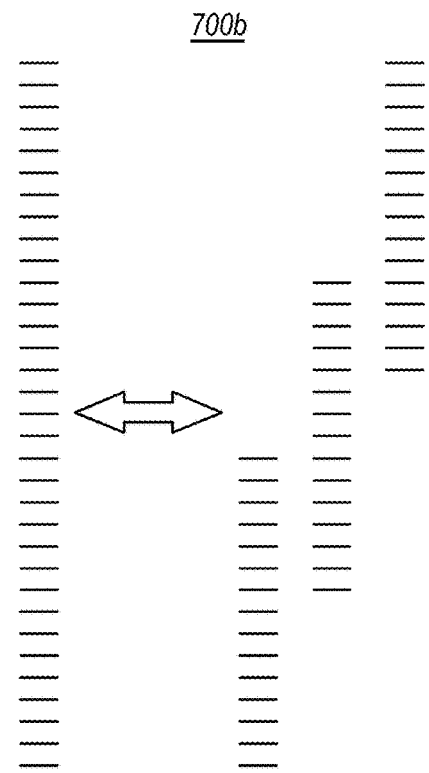
FIG. 7B illustrates an example of one to many (1:N) trace comparison, including partial traces.
Figure 7C:
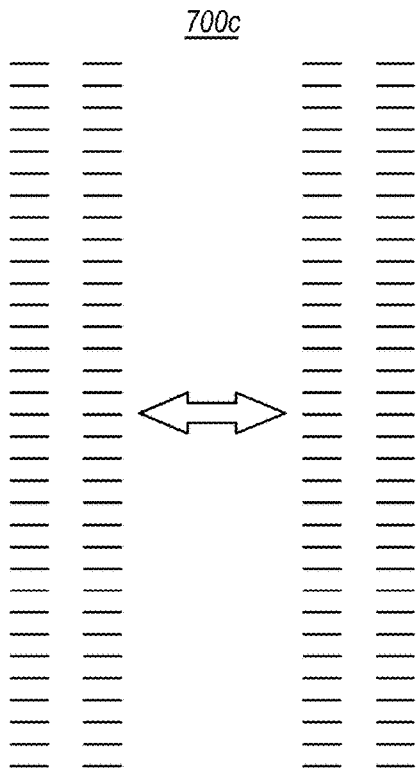
FIG. 7C illustrates an example of many to many (M:N) trace comparison.

While the debugging component 109 has been described thus far primarily in the context of performing a 1:1 diffing (i.e., one sequence of instructions on one side of a comparison against another sequence of instructions on the other side of the comparison), as indicated the debugging component 109 can in embodiments perform 1:N diffing (i.e., one sequence of instructions on one side against N sequences of instructions on the other side) and/or M:N diffing (i.e., M sequences of instructions on one side against N sequences of instructions on the other side). For example, in a 1:N diffing situation, the debugging component 109 might diff a single trace captured using a testing build of an application 112 against multiple traces captured using a production build of the application 112, or might diff a single trace captured within a testing environment against multiple traces captured within a production environment. To illustrate, FIG. 7A shows an example 700a of 1:N trace comparison, in which there is a single sequence of instructions on the left side of the comparison, and two or more different sequences of instructions on the right side of the comparison. In a M:N situation, the debugging component 109 might diff multiple traces captured using a testing build of an application 112 against multiple traces captured using a production build of the application 112, or might diff multiple traces captured within a testing environment against multiple traces captured within a production environment. FIG. 7C shows an example 700c of M:N trace comparison, in which there are multiple sequences of instructions both sides of the comparison.

When multiple traces are involved on at least one side the comparison, the debugging component 109 might utilize the alignment component 116 prior to performing a comparison by the diffing component 117. The alignment component 116 enables use of partial traces on one or more sides of the comparison. FIG. 7A showed two full traces on the right, and FIG. 7C showed two full traces on both the left and the right. In these instances, each execution trace 113 records comparable execution coverage. For example, each execution trace 113 might each record the full execution of an application 112 from beginning to end, in which case the debugging component 109 can compare that full execution. In another example, each execution trace 113 might each record the full execution of a particular sub-component an application 112 from beginning to end in which case the debugging component 109 can compare full execution of that sub-component. However, there may be cases in which execution traces 113 records different pieces an application's execution, such as between thread transitions, between transitions from user mode to kernel mode, for only particular modules or functions, for only times when there were sufficient computing resources at the tracing computer system to allow for trace recording, etc.

Figure 7D:
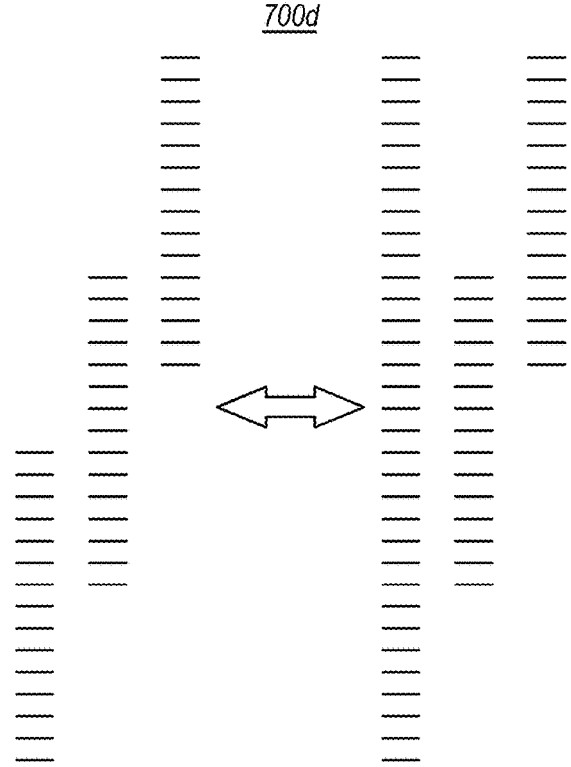
FIG. 7D illustrates an example of many to many (M:N) trace comparison, including partial traces.

The alignment component 116 can align two or more partial traces based on commonalities among those traces (e.g., comparable sequences of groupings) to provide a more complete trace coverage than is provided by each of those partial traces individually. For example, FIG. 7B shows an example 700b of 1:N trace comparison, in which the right side of the comparison is made up of multiple partial traces that have been aligned by the alignment component 116 so that a complete comparison can be made with the sequence of instructions on the left side of the comparison. FIG. 7D shows an example 700d of M:N trace comparison, in which partial traces are used on both sides of the comparison. Notably, partial traces can be used in combination with full traces on a given side of the comparison. For example, in FIG. 7D, the right side of the comparison utilizes one full trace and two partial traces.

The alignment component 116 is shown as including an exact match component 116a and an approximate match component 116b. These components 116a, 116b demonstrate that the alignment component 116 can utilize a variety of techniques to determine how two or more traces align. For example, using the exact match component 116a, the alignment component 116 might utilize a shortest common supersequence algorithm, which takes two sequences as inputs, and which finds a shortest possible common supersequence of those input sequences. Using the approximate match component 116b, on the other hand, the alignment component 116 might utilize an algorithm that allows for gaps when matching inputs sequences, such as the Needleman-Wunsch algorithm. Regardless of the type of matching used, the alignment component 116 might perform its matching based on groups of instructions identified by the grouping component 115 (e.g., functions, modules, etc.), rather than based on matching individual instructions.

As mentioned, the diffing component 117 may include a transitive analysis component 117d and a ranking/correlation component 117e, which are utilized when performing 1:N and M:N diffing. In embodiments, the transitive analysis component 117d utilizes the transitive property of equality (i.e., if A=B and B=C, then A=C) to reduce the amount of processing performed by the diffing component 117, by reducing duplicative analysis by the differencing component 117. In particular, for a given set of two or more traces, the transitive analysis component 117d identifies which sections two or more traces are equivalent, so that the analysis by the transitive analysis component 117d on one of the traces in the set can be applied to the other trace(s) in the set. In this way, the differencing component 117 can focus on analyzing distinct sections of the traces, rather than analyzing duplicative sections across the traces. To illustrate, suppose that on one side of the comparison there are four traces that execute three sections of instructions (e.g., functions) as shown in Table 5:

TABLE 5

|    | T1 | T2 | T3 | T4 |
|----|----|----|----|----|
| 1: | A  | A  | A  | A  |
| 2: | B  | D  | X  | B  |
| 3: | C  | C  | C  | C  |

In table 5, sections with the same label (e.g., A, B, C, etc.) execute equivalently. Thus, at position 1, section A on trace T1 is equivalent to section A on trace T2, section A on trace T2 is equivalent to section A on trace T3, and section A on trace T4 is equivalent to section A on trace T4. By the transitive property of equality, section A on trace T1 is also equivalent to section A on trace T3 and section A on trace T4, section A on trace T2 is also equivalent to section A on trace T4, etc. At position 3, the same is true for section C as it relates across traces T1, T2, T3, and T4. At position 2, the only equality is between section B on trace T1 and section B on trace T4.

This equality can be viewed as set of mappings, in which each mapping identifies corresponding sections that execute equivalently across multiple traces. A first mapping might map section A at position 1 to traces T1, T2, T3, and T4, a second mapping might map section B at position 2 to traces T1 and T4, and a third mapping might map section C at position 3 to traces T1, T2, T3, and T4. Based on these mappings, distinct sections can be identified. For example, a set of distinct sections across traces T1, T2, T3, and T4 might be: section A on trace T1, section B on trace T1, section D on trace T2, section X on trace T3, and section C on trace T1. Thus, in embodiments, the differencing component 117 might focus its analysis on these distinct sections, and use the transitive property to apply that analysis across the traces.

When performing 1:N diffing, the ranking/correlation component 117e can rank identified differences between the subject execution trace and the plurality of comparison execution traces, based on how frequently those differences occur between the subject execution trace and the plurality of comparison execution traces. Based on these rankings, the ranking/correlation component 117e can help identify which differences might be considered to be more important than others. For example, if a first section/group in a subject execution trace is found to be different than all corresponding sections/groups the plurality of comparison execution traces, and if a second section/group in a subject execution trace is found to be different than less than all corresponding sections/groups the plurality of corresponding traces, then a first difference between the first section/group and the comparison execution traces might be ranked more highly than a second difference between the second section/group and the comparison execution traces. Thus, the first difference might be considered to be more important than the second difference.

When performing M:N diffing, the ranking/correlation component 117e can determine which differences between a group of subject sections (selected across the plurality of subject execution traces) and a group of comparison sections (selected across the plurality of comparison execution traces) correlate highly with a particular section belonging to a group. As used herein, a "comparison section" is any subset of a trace that it big enough to contain one or more diffable events. For example, a comparison section might be a function or a group of functions (e.g., module, class, etc.). To illustrate, if a comparison section is from a function call to its return, then any piece of code that contains a function call or a function return is a diffable section. This can be true even if grouping by module first. Notably, a given event may belong to multiple comparison sections. For example, referring to Table 5, a comparison section could comprise the instructions in A plus the instructions in B, or a comparison section could comprise the second half of the instructions in A plus the first half of the instructions in B. If gaps are allowed, a comparison section could even comprise the first half of the instructions in A plus the second half of the instructions in B.

Figure 8:
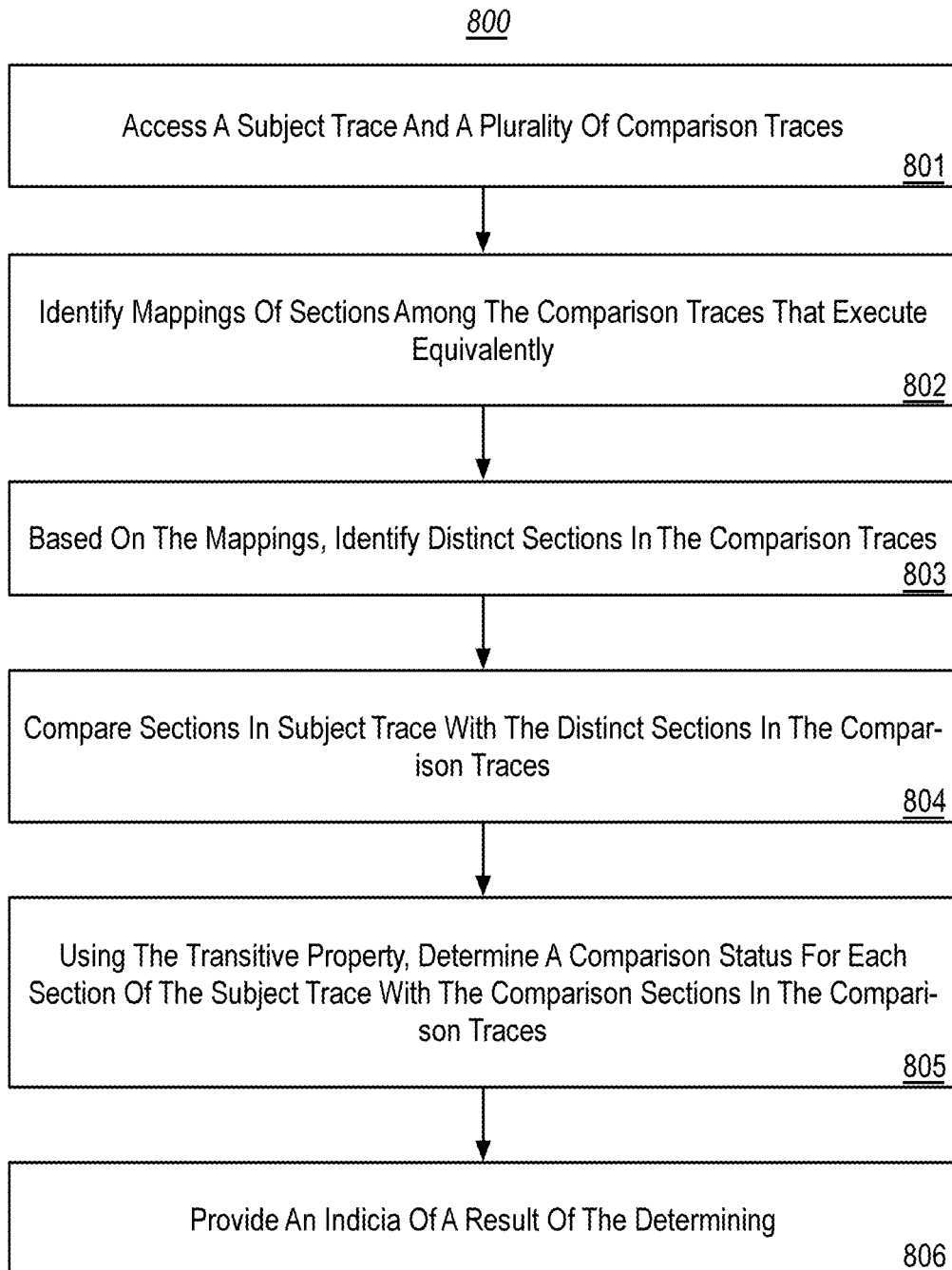
FIG. 8 illustrates a flow chart of an example method for diffing a subject replayable execution trace against a plurality of comparison replayable execution traces.

FIG. 8 illustrates a flowchart of an example method 800 for diffing a subject replayable execution trace against a plurality of comparison replayable execution traces (i.e., a 1:N diffing). Method 800 will now be described within the context of with FIGS. 1A-7D. While, for ease in description, the acts of method 800 are shown in a particular sequential order, it will be appreciated that some of these acts might be implemented in different orders, and/or in parallel.

As shown in FIG. 8, method 800 includes an act 801 of accessing a subject trace and a plurality of comparison traces. In some embodiments, act 801 comprises accessing a subject replayable execution trace, and accessing a plurality of comparison replayable execution traces, each replayable execution trace representing a corresponding sequence of executable instructions that executed as part of a corresponding executing entity. For example, similar to act 601 of method 600, act 801 can utilize the trace access component 114a to access execution traces 113. However, in act 801, the trace access component 114a can access an execution trace 113 as a subject execution trace, and access two or more execution traces 113 as comparison execution traces. For instance, referring to FIGS. 7A and 7B, the trace access component 114a might access one execution trace 113 for the left side of the comparison, and access two or more execution traces 113 for the right side of the comparison.

As mentioned, the debugging component 109 might utilize the alignment component 116 to align partial traces, such as is shown in the right side of the comparison in FIG. 7B. Thus, in act 801, at least one of the plurality of comparison replayable execution traces may be a partial trace, and method 800 might include aligning the partial trace with at least one other of the plurality of comparison replayable execution traces using the alignment component 116. In embodiments, aligning the partial trace with the at least one other of the plurality of comparison replayable execution traces comprises applying at least one of a shortest common supersequence alignment algorithm (e.g., exact match component 116a) or an approximate string alignment algorithm (e.g., approximate match component 116b).

Method 800 also includes an act 802 of identifying mappings of sections among the comparison traces that execute equivalently. In some embodiments, act 802 comprises identifying a set of mappings among the plurality of comparison replayable execution traces, each mapping of the set of mappings identifying two or more corresponding comparison sections of consecutive executable instructions within the plurality of comparison replayable execution traces that execute equivalently, each comparison section in each mapping being from a different one of the plurality of comparison replayable execution traces. For example, the transitive analysis component 117d can analyze the plurality of comparison replayable execution traces to identify corresponding sections across these replayable execution traces that execute equivalently. Referring to Table 5, for example, if the plurality of comparison execution traces included traces T1-T4, the transitive analysis component 117d might identify a first set of mappings at position 1 (i.e., section A on traces T1-T4), a second set of mappings at position 2 (i.e., section B on traces T1 and T4), and a third set of mappings at position 3 (i.e., section C on traces T1-T4).

Method 800 also includes an act 803 of, based on the mappings, identifying distinct sections in the comparison traces. In some embodiments, act 803 comprises, based on the set of mappings, identifying a plurality of distinct comparison sections within the plurality of comparison replayable execution traces, each distinct comparison section either (i) lacking a mapping in the set of mappings, or (ii) being a representative comparison section from a different mapping in the set of mappings. For example, based on the mappings identified in act 802, the transitive analysis component 117d can identify distinct sections within the plurality of comparison execution traces to compare against sections in the subject execution trace. For instance, referring again to Table 5, the transitive analysis component 117d could (i) identify sections D (trace T2) and X (trace T3) as sections that lack a mapping in the set of mappings, and (ii) identify sections A, B, and C on trace T1 as sections that are representative comparison sections from different mappings in the set of mappings. Notably, with respect to representative sections A, B, and C, the transitive analysis component 117d might have alternatively chosen those sections from among the other traces.

Notably, in act 803, the transitive analysis component 117d might choose less than all possible distinct comparison sections. For instance, the transitive analysis component 117d might initially choose to focus on sections that occur on more than one trace. In this case, the transitive analysis component 117d might (at least in a first pass) select only representative comparison sections from the set of mappings and skip sections that lack a mapping in the set of mappings. Thus, in act 803, the plurality of distinct comparison sections might comprise less than all distinct comparison sections within the plurality of comparison replayable execution traces.

Method 800 also includes an act 804 of comparing sections in subject trace with the distinct sections in the comparison traces. In some embodiments, act 804 comprises comparing the subject replayable execution trace and the plurality of comparison replayable execution traces, including at least comparing each of a plurality of subject sections of consecutive executable instructions within the subject execution trace against one or more of the plurality of distinct comparison sections. For example, similar to act 604 of method 600, act 804 can utilize the differencing component 117a to compare subject sections in the subject execution trace to comparison sections in the comparison execution traces. However, rather than comparing the subject sections to comparison sections in each comparison execution trace, the differencing component 117a can compare them to only those comparison sections that were identified by the transitive analysis component 117d as distinct sections.

Method 800 also includes an act 805 of, using the transitive property, determining a comparison status for each section of the subject trace with the comparison sections in the comparison traces. In some embodiments, act 805 comprises, based on the comparing, determining a comparison status of each of the plurality of subject sections, including determining at least one of whether each subject section is (i) equal to at least one corresponding distinct comparison section, or (ii) different than the plurality of distinct comparison sections, wherein the determined comparison status of at least one particular subject section with respect at least one particular corresponding distinct comparison section is applied to each additional comparison section to which the at least one particular distinct comparison section is mapped in the set of mappings. For example, as a result of act 804, the differencing component 117a can determine a comparison status of each subject section as it relates to a corresponding distinct comparison section. For instance, the differencing component 117a can determine that a subject section is equal to, or different than, a corresponding distinct comparison section. Then, based on the transitive property, the transitive analysis component 117*d* can apply this comparison status to other corresponding comparison sections in the comparison execution traces. Referring to Table 5, for example, suppose that the differencing component 117*a* determined that a first subject section is equal to section A in trace T1, that a second subject section is different than section B in trace T1, and that a third subject section is equal to section C in trace T1. Using the transitive property, the transitive analysis component 117*d* can apply this status to traces T2, T3, and T4. For instance, the transitive analysis component 117*d* can determine that the first subject section also equal to section A in traces T2-T4, that the second subject section is also different than section B in trace T4, and that the third subject section is also equal to section C in traces T2, T3, and T4.

In act 805, a subject section might be different than a comparison section because it is a replacement, an insertion, or a deletion. Thus, in act 805, determining that a subject section is different than the plurality of distinct comparison sections can comprise determining that the subject section is at least one of a replacement of one of the plurality of distinct comparison sections, deleted from the plurality of distinct comparison sections, or inserted into the plurality of distinct comparison sections.

Method 800 also includes an act 806 of providing an indicia of a result of the determining. In some embodiments, act 806 comprises providing an indicia of a result of the determining to a software component at the computer system, or to another computer system. For example, similar to act 605 of method 600, in act 806 the output component 118 can provide an indicia of any of the differencing information produced by the diffing component 117 to a component at computer system 101, or to another computer system (e.g., using network device(s) 105). As in act 605, this could include causing a software component to present the result of the determining at a user interface.

In embodiments, method 800 includes ranking each subject section that was determined to be different than comparison sections in one or more of the comparison traces. For example, if a first subject section was different than all the corresponding sections the comparison execution traces, then the ranking/correlation component 117*e* might rank this difference more highly (i.e., more important) than a second subject section that was different than less than all corresponding sections in the comparison execution traces. As such, method 800 might comprise assigning a ranking to each subject section determined to be different, the ranking being based on a number of the plurality of comparison replayable execution traces from which the subject section is different. Based on this ranking, in act 806, providing the indicia of the result of the determining might comprise instructing the software component or the other computer system to visually rank the one or more subject sections that are determined to be different at a user interface, based on a corresponding ranking for each of the one or more subject sections.

In method 800, each section can correspond to any grouping identified by the grouping component 115. Thus, for example, each section might correspond to a function, in which case each section corresponds to a sequence of one or more executable instructions that executed as a single function. In another example, each section might correspond to a sequence of functions, in which case wherein each section comprises a sequence of one or more related functions, each function corresponding to a sequence of one or more executable instructions that executed as the function. Similar to method 600, the comparing in act 804 can be based on group identity, function identify, function parameters, etc. Thus, comparing the subject replayable execution trace and the plurality of comparison replayable execution traces in act 804 could comprise comparing each of the plurality of subject sections against the one or more of the plurality of distinct comparison sections based at least on an identity of each section, comparing each of the plurality of subject sections against the one or more of the plurality of distinct comparison sections based at least on an identity of at least one function within each section, comparing each of the plurality of subject sections against the one or more of the plurality of distinct comparison sections based at least on function parameter information, etc.

Figure 9:
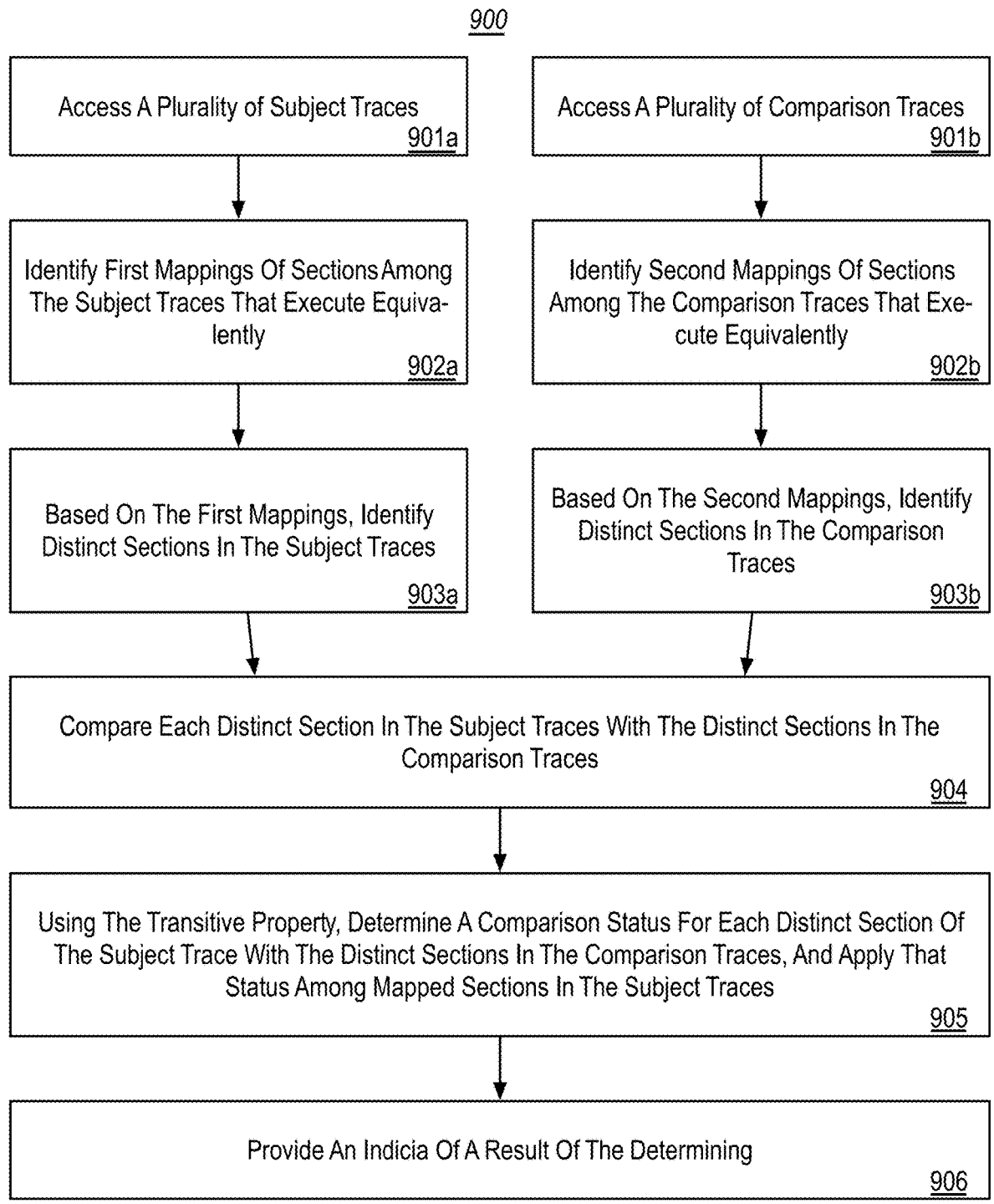
FIG. 9 illustrates a flow chart of an example method for diffing a plurality of subject replayable execution traces against a plurality of comparison replayable execution traces.

FIG. 9 illustrates a flowchart of an example method 900 for diffing a plurality of subject replayable execution traces against a plurality of comparison replayable execution traces (i.e., an M:N diffing). Method 900 will now be described within the context of with FIGS. 1-8. While, for ease in description, the acts of method 900 are shown in a particular order, it will be appreciated that some of these acts might be implemented in different orders, and/or in parallel.

In embodiments, method 900 occurs in a similar manner to method 800, except that in method 900 different mappings of equivalent sections are identified for the subject execution traces in addition to the comparison execution traces, and different sets of distinct sections are identified for the subject execution traces in addition to the comparison execution traces. Then, these distinct sections are used on both sides of the comparison, and the transitive property is applied within both of the subject execution traces and the comparison execution traces.

As shown in FIG. 9, method 900 includes acts 901*a* of accessing a plurality of subject traces and 901*b* of accessing a plurality of comparison traces. These acts 901 could be performed serially or in parallel. In some embodiments, acts 901 comprise accessing a plurality of subject replayable execution traces, and accessing a plurality of comparison replayable execution traces, each replayable execution trace representing a corresponding sequence of executable instructions that executed as part of a corresponding executing entity. For example, similar to act 801 of method 800, act 901 can utilize the trace access component 114*a* to access execution traces 113. However, in act 901, the trace access component 114*a* can access two or more execution traces 113 as subject execution traces, as well as access two or more execution traces 113 as comparison execution traces. For instance, referring to FIGS. 7C and 7D, the trace access component 114*a* might access two or more execution traces 113 for the left side of the comparison, and access two or more execution traces 113 for the right side of the comparison.

The debugging component 109 might utilize the alignment component 116 to align partial traces, such as is shown in the left and right sides of the comparison in FIG. 7D. Thus, in act 901, at least one of the plurality of subject replayable execution traces may be a partial subject execution trace, and/or at least one of the plurality of comparison replayable execution traces may be a partial comparison execution trace. When at least one of the plurality of subject replayable execution traces is a partial subject execution trace, method 900 might include aligning the partial subject execution trace with at least one other of the plurality of subject replayable execution traces. When at least one of the plurality of comparison replayable execution traces is a partial comparison execution trace, method 900 might include aligning the partial comparison execution trace with at least one other of the plurality of comparison replayable execution traces. In embodiments, aligning a partial subject or comparison execution trace with the at least one other partial or comparison replayable execution trace comprises applying at least one of a shortest common supersequence alignment algorithm (e.g., exact match component 116a) or an approximate string alignment algorithm (e.g., approximate match component 116b).

Method 900 also includes an act 902a of identifying first mappings of sections among the subject traces that execute equivalently and 902b of identifying second mappings of sections among the comparison traces that execute equivalently. These acts 902 could be performed serially or in parallel. In some embodiments, act 902a comprises identifying a first set of mappings among the plurality of subject replayable execution traces, each mapping of the first set of mappings identifying two or more corresponding subject sections of consecutive executable instructions within the plurality of subject replayable execution traces that execute equivalently, each subject section in each mapping being from a different one of the plurality of subject replayable execution traces. For example, similar to how, in act 802 of method 800, the transitive analysis component 117d analyzed comparison replayable execution traces to identify corresponding comparison sections that executed equivalently, in act 902a the transitive analysis component 117d can identify a first set of mappings among corresponding subject sections across the accessed subject replayable execution traces that execute equivalently.

In some embodiments, act 902b comprises identifying a second set of mappings among the plurality of comparison replayable execution traces, each mapping of the second set of mappings identifying two or more corresponding comparison sections of consecutive executable instructions within the plurality of comparison replayable execution traces that execute equivalently, each comparison section in each mapping being from a different one of the plurality of comparison replayable execution traces. For example, act 902b may occur in substantially the same manner as act 802 of method 800 to identify a second set of mappings among corresponding comparison sections across the accessed comparison replayable execution traces that execute equivalently.

Method 900 also includes an act 903a of, based on the first mappings, identifying distinct sections in the subject traces and an act 903b of, based on the second mappings, identifying distinct sections in the comparison traces. These acts 903 could be performed serially or in parallel. In some embodiments, act 903a comprises, based on the first set of mappings, identifying a plurality of distinct subject sections within the plurality of subject replayable execution traces, each distinct subject section either (i) lacking a mapping in the first set of mappings, or (ii) being a representative subject section from a different mapping in the first set of mappings. For example, similar to how, in act 803 of method 800, the transitive analysis component 117d used a set of mappings to identify distinct sections within the plurality of comparison execution traces to compare against sections in the subject execution trace, in act 903a the transitive analysis component 117d can use the first set of mappings to identify distinct sections within the plurality of subject execution traces to compare against distinct sections in the comparison execution traces.

In some embodiments, act 903b comprises, based on the second set of mappings, identifying a plurality of distinct comparison sections within the plurality of comparison replayable execution traces, each distinct comparison section either (i) lacking a mapping in the second set of mappings, or (ii) being a representative comparison section from a different mapping in the second set of mappings. For example, act 903b may occur in substantially the same manner as act 803 of method 800, by using the second set of mappings to identify distinct sections within the plurality of comparison execution traces to compare against distinct sections in the subject execution traces.

Notably, in act 903a and/or 903b, the transitive analysis component 117d might choose less than all possible distinct subject and/or comparison sections. For instance, the transitive analysis component 117d might initially choose to focus on sections that occur on more than one trace. In this case, the transitive analysis component 117d might (at least in a first pass) select only representative sections from a set of mappings and skip sections that lack a mapping in the set of mappings. Thus, in act 903a, the plurality of distinct subject sections might comprise less than all distinct subject sections within the plurality of subject replayable execution traces. In act 903b, the plurality of distinct comparison sections might comprise less than all distinct comparison sections within the plurality of comparison replayable execution traces.

Method 900 also includes an act 904 of comparing each distinct section in the subject traces with the distinct sections in the comparison traces. In some embodiments, act 904 comprises comparing the plurality of subject replayable execution traces and the plurality of comparison replayable execution traces, including at least comparing each of the plurality of distinct subject sections against one or more of the plurality of distinct comparison sections. For example, similar to how, in act 804 of method 800, the differencing component 117a compared subject sections from a single subject execution trace to distinct comparison sections from a plurality of comparison execution traces, in act 904 the differencing component 117a can compare the distinct subject sections (i.e., identified in act 903a) from the plurality of subject execution traces to the distinct comparison sections (i.e., identified in act 903b) from the plurality of comparison execution traces.

Method 900 also includes an act 905 of, using the transitive property, determining a comparison status for each distinct section of the subject trace with the distinct sections in the comparison traces, and apply that status among mapped sections in the subject traces. In some embodiments, act 905 comprises, based on the comparing, determining a comparison status of each of the plurality of distinct subject sections, including determining at least one of whether each distinct subject section is (i) equal to at least one corresponding distinct comparison section, or (ii) different than the plurality of distinct comparison sections, wherein the determined comparison status of at least one particular distinct subject section with respect at least one particular corresponding distinct comparison section is applied to (i) each additional comparison section to which the at least one particular distinct comparison section is mapped in the second set of mappings, and to (ii) each additional subject section to which the at least one particular distinct subject section is mapped in the first set of mappings. For example, similar to how, in act 805 of method 800, the transitive analysis component 117d applied a determined comparison status of a distinct comparison section to corresponding comparison sections in the comparison execution traces, in act 905 the transitive analysis component 117d can apply a determined comparison status of a distinct comparison section to corresponding comparison sections in the comparison execution traces (i.e., based on the second mappings). In addition, however, in act 905 the transitive analysis component 117d can also apply a determined comparison status of a distinct subject section to corresponding subject sections in the subject execution traces (i.e., based on the first mappings).

In act 905, a subject section might be different than a comparison section because it is a replacement, an insertion, or a deletion. Thus, in act 905, determining that a distinct subject section is different than the plurality of distinct comparison sections might comprise determining that the distinct subject section is at least one of a replacement of one of the plurality of distinct comparison sections, deleted from the plurality of distinct comparison sections, or inserted into the plurality of distinct comparison sections.

Method 900 also includes an act 906 of providing an indicia of a result of the determining. In some embodiments, act 906 comprises providing an indicia of a result of the determining to a software component at the computer system, or to another computer system. For example, similar to act 806 of method 800, in act 906 the output component 118 can provide an indicia of any of the differencing information produced by the diffing component 117 to a component at computer system 101, or to another computer system (e.g., using network device(s) 105). As in act 806, this could include causing a software component to present the result of the determining at a user interface.

In embodiments, method 900 includes, for a first group of subject sections across the plurality of subject execution traces, determining which differences between the first group and a second group of comparison sections across the plurality of comparison execution traces correlate highly with a subject section belonging to the first group. Based on these correlations, in act 906, providing the indicia of the result of the determining might comprise instructing the software component or the other computer system to identify one or more differences which correlate highly with a subject section belonging to a particular group.

In method 900, each section can correspond to any grouping identified by the grouping component 115. Thus, for example, each section might correspond to a function, in which case each section corresponds to a sequence of one or more executable instructions that executed as a single function. In another example, each section might correspond to a sequence of functions, in which case each section comprises a sequence of one or more related functions, each function corresponding to a sequence of one or more executable instructions that executed as the function. Similar to method 800, the comparing in act 904 can be based on group identity, function identify, function parameters, etc. Thus, comparing the plurality of subject replayable execution traces and the plurality of comparison replayable execution traces in act 904 could comprise comparing each of the plurality of distinct subject sections against the one or more of the plurality of distinct comparison sections based at least on an identity of each section, comparing each of the plurality of distinct subject sections against the one or more of the plurality of distinct comparison sections based at least on an identity of at least one function within each section, comparing each of the plurality of distinct subject sections against the one or more of the plurality of distinct comparison sections based at least on function parameter information, etc.

Accordingly, the embodiments described herein can diff a single subject execution trace against a single comparison execution trace (e.g., 1:1), can diff a single subject execution trace against a plurality of comparison execution traces (e.g., 1:N), and/or can diff a plurality of subject execution traces against a plurality of comparison execution traces (e.g., M:N). The embodiments herein operate by grouping sequences of related executable instructions, and performing diffing based on attributes of those groups to determine if the groups executed equivalently, even if the particular instructions in those groups differed. Thus, the embodiments herein can diff sets of traced instructions, even where those instructions executed from applications having different binaries (e.g., due code changes, compiler changes, compiler settings changes, processor ISA changes, and the like). In addition, the embodiments herein can diff different sections of traced instructions at different levels of detail, enabling processing resources to be devoted to those areas of particular interest.

In addition to the foregoing, the inventor has developed matching techniques that the debugging component 109 can apply to determine which traces should be diffed. In some embodiments, these additional techniques operate to identify execution traces (or portions thereof) that are likely to represent execution of different entities at times when those entities were performing similar types of work. In this way, these matching techniques can identify traces for diffing that are likely to produce useful diffing results, while avoiding identifying traces for diffing that are less likely to produce useful diffing results. In embodiments, these matching techniques include an intelligent matching of execution traces from among pluralities of subject and/or comparison executable entities (e.g., threads, processes, etc.) for execution traces that represent similar work and/or an intelligent matching of tasks performed by threads in subject thread pool and a comparison thread pool. To represent intelligent matching functionality, FIG. 1B illustrates that the debugging component 109 can include a matching component 119.

Referring first to intelligent matching of execution traces from among pluralities of subject and/or comparison executable entities, in embodiments the matching component 119 is configured to identify a collection of execution trace pairs from among traces of threads of a subject process and traces of threads of a comparison process. Thus, if the trace access component 114a accesses a plurality of subject execution traces that each represents execution of a different subject thread of a plurality of subject threads of a subject process, and if the trace access component 114a accesses a plurality of comparison execution traces that each represents execution of a different comparison thread of a plurality of comparison threads of a comparison process, the matching component 119 can identify a collection of execution trace pairs from among the subject process and the comparison process. In particular, the matching component 119 can identify one or more execution trace pairs that each comprises a particular subject execution trace representing execution of a particular subject thread of the subject process, and a particular comparison trace representing execution of a particular comparison thread of the comparison process, where the particular subject thread and the particular comparison thread are identified by the matching component 119 as having performed similar types of work.

In embodiments, the matching component 119 matches subject and comparison execution traces based on the symbols, such as debugging symbols, represented within those traces. In embodiments, the matching component 119 represents these symbols in a string form which, in an example, could comprise a module name and namespace name, a class name, a function name, etc. For instance, one concrete example of a symbol is "wsdapi!CUdpSocketOverlapped::InitInstance," where "wsdapi" is a module, "CUdpSocketOverlapped" is a class, and "InitInstance" is a function. Another concrete example of a symbol is "msvsmon!Dbg::CFirewallConfiguration2::InitFirewallMode," where "msvsmon" is a module, "Dbg" is a namespace, "CFirewallConfiguration2" is a class, and "InitFirewallMode" is a function. In other examples, symbols could be represented with additional, or alternative, information. For instance, a function might be represented along with its caller, its parameter types, and the like.

In embodiments, the matching component 119 matches subject and comparison execution traces based on identifying a list of symbols represented by each of those subject and comparison execution traces. This could include the matching component 119 identifying all symbols represented by those traces, or the matching component 119 identifying a subset of all symbols. A subset could comprise, for example, only symbols associated with module transitions, or only symbols associated with paths that lead to module transitions. Regardless of whether the matching component 119 identifies all the symbols, or only a subset of symbols, that are represented by subject and comparison traces that are to be matched, in embodiments the matching component 119 utilizes set unions (U) and/or set intersections (n) between the symbols of subject and comparison traces to determine how similarly the entities represented by those execution traces executed.

In some embodiments, the matching component 119 can operate even if symbols are not available to the matching component 119. For example, the functions that are exported from a library (e.g., a DLL or a shared object) by name have, in that export, a name that can be used by the matching component 119 for diffing purposes. Even if a function is not exported by name, its relative virtual address (RVA) plus its corresponding module can be used as a unique identifier that is stable for a given version of a binary. In addition, some runtimes (e.g., JAVA and the Common Language Runtime) produce some metadata that can be used for diffing as they just-in-time compile intermediate language instructions.

In general, the matching component 119 computes a score for a trace of each subject thread in a subject process with a trace of each comparison thread in a comparison process, and then identifies a collection of thread pairs based on those scores. In some embodiments, the matching component 119 performs this scoring by dividing a number derived from an intersection of the symbols in two threads by a number derived from a union of the symbols in those threads. To illustrate, when computing a score S of a trace of a subject thread $T_A$ from a subject process $P_A$ versus a trace of a comparison thread $T_B$ from a comparison process $P_B$ the matching component 119 might compute S as follows:

$$S = \frac{sizeOf(T_A \cap T_B)}{sizeOf(T_A \cup T_B)}$$

As will be appreciated, when computed in this way, the score S will be a number between 0 and 1—with S approaching 1 as a number of symbols in common between threads $T_A$ and $T_B$ approaches a number of the combined symbols present in threads $T_A$ and $T_B$. Thus, in embodiments, the closer the score S is to 1 for threads $T_A$ and $T_B$, the more similar the matching component 119 considers these threads to have executed (i.e., because they have more symbols in common). As a simple illustration, suppose that threads $T_A$ and $T_B$ include instances of the symbols A, B, C, and D, in the manner shown in Table 6:

TABLE 6

| Thread $T_A$ | Thread $T_B$ |
|---|---|
| A | B |
| A | B |
| B | C |
| B | C |
| B | D |
| B | D |
| C | D |

Here, the intersection of the symbols in threads $T_A$ and $T_B$ is the collection {B, C}, while the union of the symbols in threads $T_A$ and $T_B$ is the collection {A, B, C, D}. Thus, dividing the size of the intersection of the symbols in threads $T_A$ and $T_B$ (i.e., 2) by the size of the union of the symbols in threads $T_A$ and $T_B$ (i.e., 4) is 0.5.

Notably, the matching component 119 could compute a score S for two traces in a variety of ways. In one variation, for example, the matching component 119 computes collections from intersections and unions that include a total count of each symbol (rather than only unique symbols). For instance, in the context of Table 6, an intersection of the symbols in threads $T_A$ and $T_B$ could be the collection {B, B, C}, while a union of the symbols in threads $T_A$ and $T_B$ could be the collection {A, A, B, B, B, B, C, C, D, D, D}. In this example, dividing the size of the intersection of the symbols in threads $T_A$ and $T_B$ (i.e., 3) by the size of the union of the symbols in threads $T_A$ and $T_B$ (i.e., 11) is 0.27.

In some embodiments, when computing a score between two threads, the matching component 119 weights individual symbols within those thread differently, based on factors such as the symbol's frequency, whether it appears in both threads, whether it appears in one process and not the other, etc. This is based on a recognition by the inventor that, when using symbols to determine if different threads executed similarly, a given symbol can carry a different amount of information depending on its frequency across threads. For example, a symbol would typically carry more information if it appears in a single thread only than if it appears in all threads. Thus, for example, referring to Table 6 above, it may make sense to apply a higher weight to symbol C than symbol B. As a practical example, symbol B could correspond to a frequently-called printing function that imparts relatively little information about the work a thread performed, while symbol C could correspond to a less frequently-called work function that imparts a greater amount of information about the work a thread performed.

These concepts are based on based on the principle of information entropy. Under the principle of information entropy, the "news value" of a communicated message depends on the degree to which the content of the message is surprising. If an event is very probable, it is no surprise (and generally uninteresting) when that event happens as expected. However, if an event is unlikely to occur, it is much more informative to learn that the event happened or will happen. Thus, information content (also called the surprisal) of an event is an increasing function of the reciprocal of the probability of the event. For instance, execution of a less-common function is much more informative as to what work a thread is doing than execution of a more-common function.

In an example, using the principle of information entropy, the scores S for threads $T_A$ and $T_B$ that are part of processes $P_A$ and $P_B$ could be computed using based on the following formula:

$$S = \text{Average}\left(\frac{I(T_A \cap T_B, TFP_A)}{I(T_A \cap P_B, TFP_A)}, \frac{I(T_B \cap T_A, TFP_B)}{I(T_B \cap P_A, TFP_B)}\right)$$

In this formula, $TFP_A$ represents the amount of information a given symbol provides based on its thread frequency in process $P_A$ (i.e., how many threads in process $P_A$ that the symbol appears on), and $TFP_B$ represents the amount of information the symbol provides based on its thread frequency in process $P_B$ (i.e., how many threads in process $P_B$ that the symbol appears on). In embodiments, the amount of information for a given symbol is computed as an information score IS using the formula:

$$IS = -\log_2\left(\frac{SF}{TS}\right)$$

where SF is how frequently the symbol appears in the threads of the process, and TS is the total number of symbols in the process generally. For each symbol in the set of the set of symbols in its left parameter, the I( ) function determines an information score for the symbol based on the process in its right term, then produces a sum of all these information scores. For example, for $I(T_A \cap T_B, TFP_A)$ the I( ) function computes the set of symbols in the intersection of threads $T_A$ and $T_B$. Then, for each of these symbols, the I( ) function computes an information score for the symbol as it relates to process $P_A$. Using the individual information scores for each symbol in the set, the I( ) function then produces a sum of all the information scores. The average could be computed as a geometric average, an arithmetic average, or a weighted average, but in embodiments, a geometric average is used.

As mentioned, the matching component 119 might additionally, or alternatively, intelligently match tasks performed by threads in a subject thread pool and a comparison thread pool. The inventor has recognized that it can be a challenge to diff traces of subject and comparison threads are part of a thread pool executing a queue tasks. This is because, depending on factors such as a number of processor cores available, processor loads, scheduling decisions, etc. a given set of tasks might be distributed to two different sets of threads in very different ways. As an example, suppose there is a queue of tasks, A, B, C, D, E, F, G, and H. Further suppose that a subject thread pool (e.g., process $P_A$) comprises two threads $T_{A-1}$ and $T_{A-2}$, while a comparison thread pool (e.g., process $P_B$) comprises three threads $P_{B-1}$, $P_{B-2}$, and $P_{B-3}$. FIG. 10A illustrates a table 1000a that shows an example of how this queue of tasks might be distributed across the threads. As shown in table 1000a on process $P_A$, thread $T_{A-1}$ could take up task A for processing, while thread $T_{A-2}$ takes up task B for processing. After completing task A thread $T_{A-1}$ could take up task C for processing, and after completing task B thread $T_{A-2}$ could take up task D for processing, and so on. Similarly, on process $P_B$, thread $T_{B-1}$ could take up task A for processing, while thread $T_{B-2}$ takes up task B for processing and thread $T_{B-3}$ takes up task C for processing. After completing task A thread $T_{B-1}$ could take up task D, after completing task B thread $T_{B-2}$ could take up task E, and so on. Since processes $P_A$ and $P_B$ have different numbers of threads, the individual threads have processed different sets of tasks. For example, thread $T_{A-1}$ processed tasks A, C, E, and G, while thread $T_{B-1}$ processed tasks A, D, and G. Thus, as between the threads of processes $P_A$ and $P_B$, there might not be a good match between threads that performed similar work.

In embodiments, in these thread pool situations, the matching component 119 matches trace/thread portions that correspond to the same/similar tasks, rather than matching entire traces of entire threads that perform similar work. For example, the matching component 119 could identify one portion of a trace of thread $T_{A-1}$ that matches to a portion of a trace of thread $T_{B-1}$ during execution of task A by both of those threads, and could also identify a different portion of the trace of thread $T_{A-1}$ that matches to a portion of a trace of thread $T_{B-2}$ during execution of task E by both of those threads. Thus, at one time the matching component 119 matches a trace of a subset of thread $T_{A-1}$ to trace of a subset of thread $T_{B-1}$, while at another time the matching component 119 matches a trace of a subset of thread $T_{A-1}$ to a trace of a subset of thread $T_{B-2}$.

In embodiments, the matching component 119 identifies matching trace portions using symbols obtained by those traces to identify which tasks are being performed, and when. In embodiments, rather than considering all symbols/tasks across these threads at once, which could be computationally prohibitive given a large number of threads and/or given the number of task performed by those threads, the matching component 119 considers only a sliding window of symbols/tasks. In embodiments, this sliding window is considered in combination with a MergeSort algorithm. FIGS. 10B-10G illustrate an example of performing a MergeSort on table 1000a of FIG. 10A, using a sliding windows of two tasks. Initially, FIG. 10B shows a table 1000b, in which a window of two tasks is considered on each thread (as indicated by the highlighting). Thus, the matching component 119 considers only these highlighted tasks for matching. Here, the matching component 119 could match task A on threads $T_{A-1}$ and $T_{B-1}$. Since a match was found on threads $T_{A-1}$ and $T_{B-1}$, the matching component 119 can move the sliding window on those threads, as shown in table 1000c in FIG. 10C. Next, the matching component 119 could match task B on threads $T_{A-2}$ and $T_{B-2}$ based on the tasks in this new sliding window, and move the sliding window on those threads, as shown in table 1000d in FIG. 10D. Here, the matching component 119 could match task C on threads $T_{A-1}$ and $T_{B-3}$, and move the sliding window on those threads, as shown in table 1000e in FIG. 10E. Note that since there were only two tasks on thread $T_{B-3}$, only one task (i.e., task F) is now within the new sliding window for that thread. Now, the matching component 119 could match task D on threads $T_{A-2}$ and $T_{B-1}$, and move the sliding window on those threads, as shown in table 1000f in FIG. 10F. Here, there is no only one task (i.e., task G) within the new sliding window thread on thread $T_{B-1}$. Now, the matching component 119 could match task E on threads $T_{A-1}$ and $T_{B-2}$, and move the sliding window on those threads. Although not illustrated, there would now be only task G and H left, each within a sliding window of one, and these tasks could then be selected (i.e., task G on threads $T_{A-1}$ and $T_{B-1}$, and task H on threads $T_{A-2}$ and $T_{B-2}$).

In addition to the foregoing matching techniques, the inventor has also developed tree-based diffing techniques that the diffing component 117 can apply when performing a diff between traces. In some embodiments, these tree-based diffing techniques operate to reduce an amount of data processed when actually performing the diffing between two traces, as compared to other diffing techniques. In general, when implementing these tree-based diffing techniques, the diffing component 117 creates a first tree for a subject execution trace, and creates a second tree for a comparison execution trace. In embodiments, each tree corresponds to function calls made by an entity represented by the trace used to make the tree. As will be appreciated, the diffing component 117 could obtain function calls from a list of symbols identified in those traces such as, for example, a list of symbols identified as part of creating comparison trace pairs using the matching techniques previously described. When implementing these tree-based diffing techniques, the diffing component 117 then creates a differencing (diffing) tree from these two call trees. Each node in the diffing tree represents an equality, or a difference, between the call trees. When implementing these tree-based diffing techniques, the diffing component 117 assigns a cost (or score) for each of these nodes, and uses these costs to identify relevant differences between the call trees.

Figure 11:
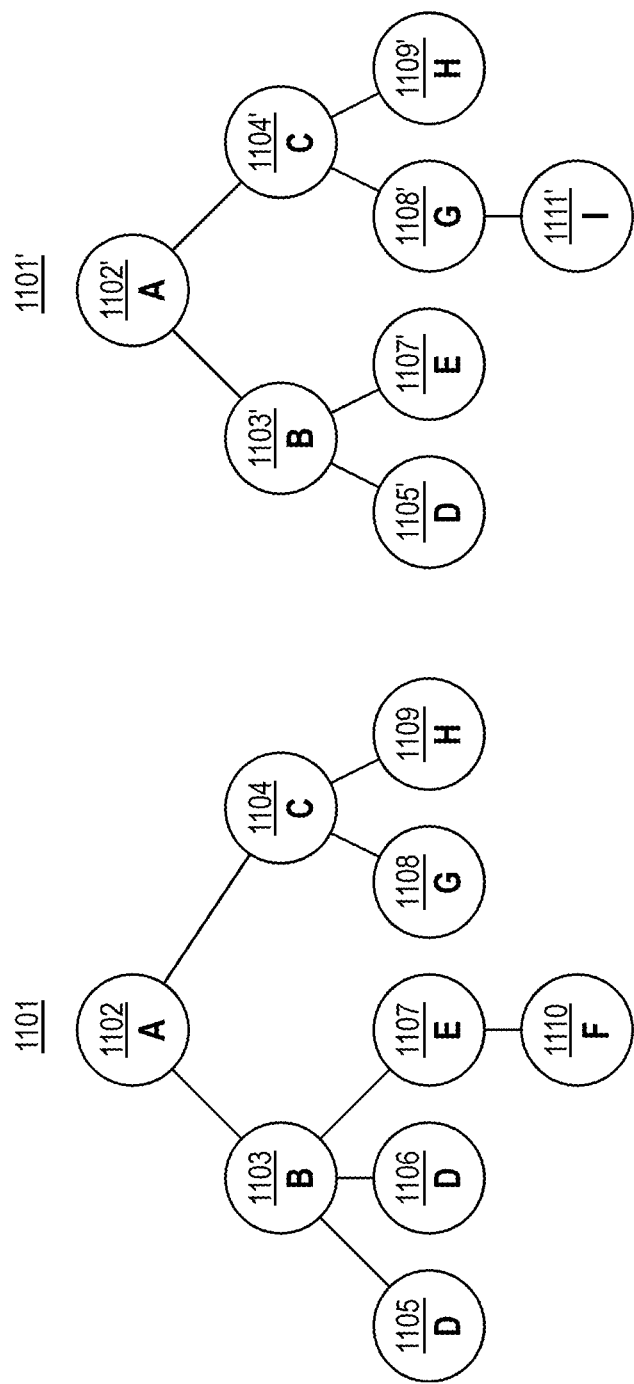
FIG. 11 illustrates an example of call trees created from execution traces.
Figure 12:
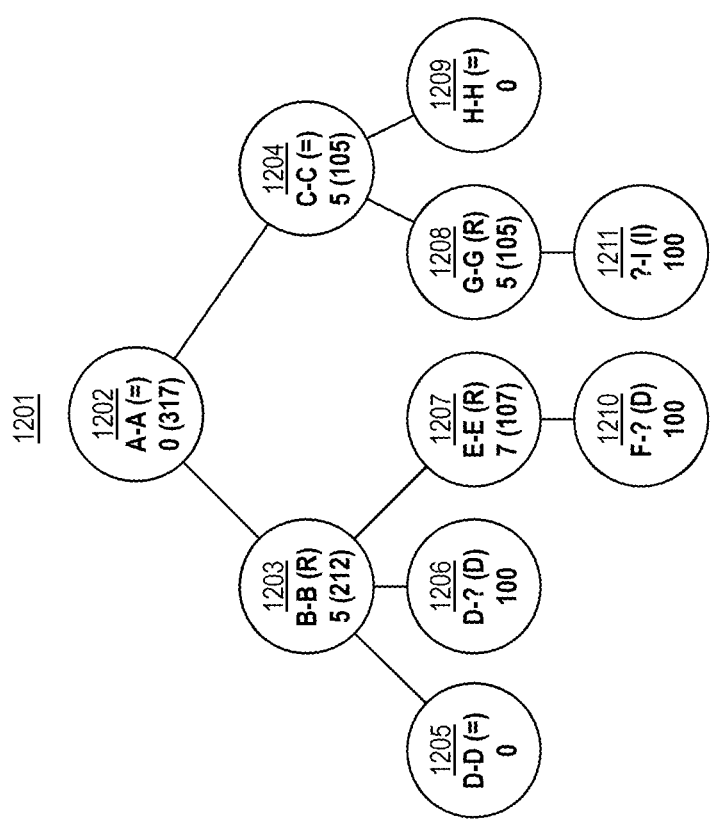
FIG. 12 illustrates an example of a differencing tree created from the call trees of FIG. 11.

FIGS. 11 and 12 illustrate an example of tree-based diffing. Initially, FIG. 11 shows two example call trees 1101 and 1101', each representing a hierarchy of function calls made by a different corresponding execution trace. In FIG. 11, call tree 1101 includes an arrangement of nodes 1102-1110, and call tree 1101' includes an arrangement of nodes 1102'-1109' and 1111'. Each of these nodes corresponds to a function instance, with any child nodes representing function calls made by that function instance. For example, as represented in in call tree 1101, function A (node 1102) called functions B (node 1103) and C (node 1104); function B, in turn, called function D twice (nodes 1105 and 1106) and also function E (node 1107), while function C called functions G (node 1108) and H (node 1109); finally function E called function F (node 1110). As represented in in call tree 1101', function A (node 1102') also called functions B (node 1103') and C (node 1104'); function B, in turn, called function D once (node 1105') and also function E (node 1107'), while function C also called functions G (node 1108') and H (node 1109'); finally, function G called function I (node 1111').

FIG. 12 shows an example differencing tree 1201, which represents and scores a transformation from call tree 1101 to call tree 1101'. In general, a given node in differencing tree 1201 represents whether a node in call tree 1101' and a node in call tree 1101 are equal, whether a node in call tree 1101' replaces a node in call tree 1101, whether a node in call tree 1101' is present only in call tree 1101' (i.e., an insertion), or whether a node in call tree 1101 is present only in call tree 1101 (i.e., a deletion). In embodiments, these differences are calculated based on corresponding nodes in the trees (if present), plus their immediate children (if any).

To illustrate, root node 1202 in tree 1201 corresponds to a diffing of node 1102 in call tree 1101 (i.e., function A) and node 1102' in call tree 1101' (i.e., function A), and indicates an equality (=). In embodiments, this indication of equality is based on the fact that both of nodes 1102 and 1102' have the same number of child nodes and/or that they have comparable sets of children nodes (i.e., node 1102 has child nodes 1103 and 1104 while node 1102' has child nodes 1103' and 1104', and both of these sets of child nodes represent calls to functions B and C, in that order).

Continuing to the second level of nodes, node 1203 in tree 1201 corresponds to a diffing of node 1103 in call tree 1101 (i.e., function B) and node 1103' in call tree 1101' (i.e., function B), and indicates a replacement (R). In embodiments, this indication of replacement is based on the fact that nodes 1103 and 1103' have different numbers of child nodes and/or that they have distinct sets of children nodes (i.e., node 1103 has child nodes 1105-1107 representing calls to functions D, D, and E, while node 1103' has child nodes 1105' and 1107' representing calls to functions D and E only). In addition, node 1204 in tree 1201 corresponds to a diffing of node 1104 in call tree 1101 (i.e., function C) and node 1104' in call tree 1101' (i.e., function C), and also indicates equality (=). In embodiments, this indication of equality is based on the fact that both of nodes 1104 and 1104' have the same number of child nodes and/or that they have comparable sets of children nodes (i.e., node 1104 has child nodes 1108 and 1109 while node 1104' has child nodes 1108' and 1109', and both of these sets of child nodes represent calls to functions G and H, in that order).

Continuing to the third level of nodes, node 1205 in tree 1201 corresponds to a diffing of node 1105 in call tree 1101 (i.e., function D) and node 1105' in call tree 1101' (i.e., function D), and indicates equality (=). Node 1206 in tree 1201 corresponds to node 1106 in call tree 1101 (i.e., function D) which has no corresponding node in call tree 1101', and thus indicates a deletion (D). Node 1207 in tree 1201 corresponds to a diffing of node 1107 in call tree 1101 (i.e., function E) and node 1107' in call tree 1101' (i.e., function E), and indicates replacement (R), since node 1107 has a child and node 1107' does not. Node 1208 in tree 1201 corresponds to a diffing of node 1108 in call tree 1101 (i.e., function G) and node 1108' in call tree 1101' (i.e., function G), and indicates replacement (R), since node 1108' has a child and node 1108 does not. Completing the third level of nodes, node 1209 in tree 1201 corresponds to a diffing of node 1109 in call tree 1101 (i.e., function H) and node 1109' in call tree 1101' (i.e., function H), and indicates equality (=).

Continuing to the fourth level of nodes, node 1210 in tree 1201 corresponds to node 1110 in call tree 1101 (i.e., function F) which has no corresponding node in call tree 1101', and thus indicates deletion (D). Node 1211 in tree 1201 corresponds to node 1111' in call tree 1101' (i.e., function I) which has no corresponding node in call tree 1101, and thus indicates an insertion (I).

Each node in differencing tree 1201 also includes a diffing cost or score. In embodiments, for each node, the node's diffing cost is based on a score attributed to it based on its diffing status, plus the total diffing costs of the node's children. For example, in tree 1201 insertions and deletions are each assigned a cost of 100, equality is assigned a cost of 0, and replacements are assigned a cost (e.g., 5, 7, etc.) based on additional attributes of the replacement (e.g., whether they have the same or different function names, return values, etc.). Thus, nodes 1202, 1204, 1205, and 1209 are each attributed a cost of 0 for their equality, and nodes 1206, 1210, and 1211 are each attributed a cost of 100 for being an insertion or deletion. Nodes 1203, 1207, and 1208 are each attributed costs of 5, 7, and 5, respectively, for being replacements. Each node's total cost is shown in parenthesis, which includes the node's attributed cost for its diffing status, plus the total costs of its children.

Based on differencing tree 1201, including the costs assigned to each node, the diffing component 117 can identify areas of significant difference between call trees 1101 and 1101'. In embodiments, the diffing component 117 starts at the root node and works down. At each node, the diffing component 117 considers the total cost of the subject node, and proceeds to the child node that contributed the largest portion to that cost. In embodiments, the diffing component 117 proceed until no clear path forward (i.e., there is no single child node that contributed to the present node's cost more than other child nodes, at least within one or more defined thresholds). For example, node 1202 has a cost of 317, and has two children—nodes 1203 and 1204 having costs of 212 and 105, respectively. Thus, in embodiments, the diffing component 117 would proceed to node 1203 since it contributed most to node 1202's cost. Now, node 1203 has cost of 212, and has three children—nodes

1205, 1206, and 1207 having costs of 0, 100, and 107, respectively. In some embodiments, the diffing component 117 could proceed to node 1207 since it contributed most to the cost of node 1203, but in other embodiments the diffing component 117 would stop at node 1203, since nodes 1206 and 107 contributed relatively similar costs. When the diffing component 117 stops at node 1203, it could identify node 1103 versus node 1103' as being a significant difference between call trees 1101 and 1101'. Thus the output component 118 could produce an output that this was a point of divergence between the traces used to generate call trees 1101 and 1101'.

Figure 13:
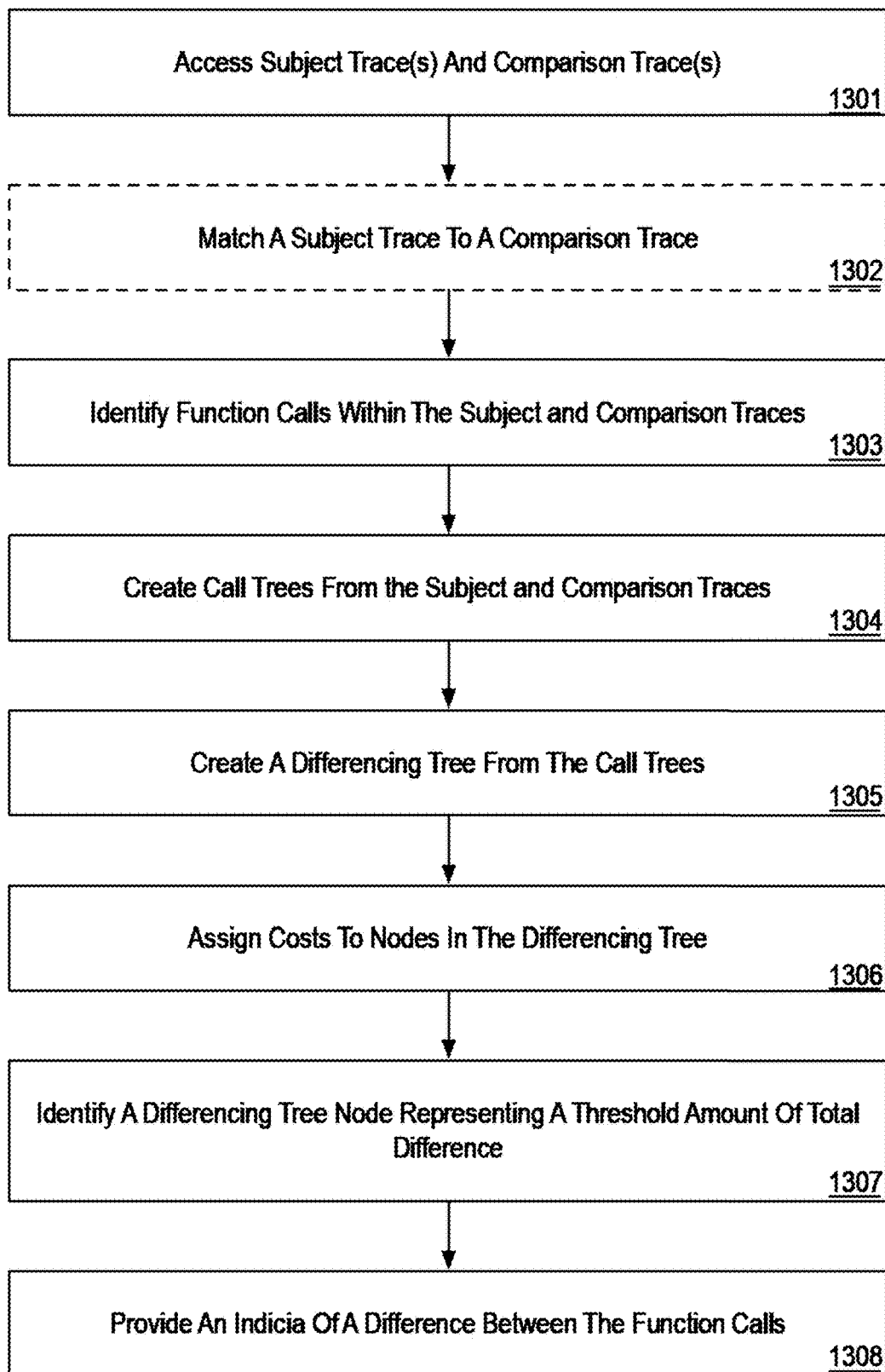
FIG. 13 illustrates a flow chart of an example method for performing a tree-based diffing of a subject replayable execution trace against a comparison replayable execution trace.

In view of the foregoing, FIG. 13 illustrates a flowchart of an example method 1300 for performing a tree-based diffing of a subject replayable execution trace against a comparison replayable execution trace. Method 1300 will now be described with reference to FIGS. 1A, 1B, and 10A-13. While, for ease in description, the acts of method 1300 are shown in a particular order, it will be appreciated that some of these acts might be implemented in different orders, and/or in parallel.

As shown in FIG. 13, method 1300 includes an act 1301 of accessing subject trace(s) and comparison trace(s). For example, the trace access component can access one or more execution traces 113, which can include one or more subject traces of an application 112, and one or more comparison traces of an application 112. As part of act 1301, method 1300 can include identifying a first subject replayable execution trace which represents a first sequence of executable instructions that executed as part of a first executable entity, and identifying a second comparison replayable execution trace which represents a second sequence of executable instructions that executed as part of a second executable entity. These subject and comparison replayable execution traces might be identified, for example, because only a single subject and single comparison trace were accessed in act 1301.

However, it may be that multiple subject and comparison traces were accessed in act 1301, such as corresponding to multiple threads of a process, thread pool, etc. Thus, in some embodiments, method 1300 can also include an act 1302 of matching a subject trace to a comparison trace (e.g., by the matching component 119). The particular techniques employed by the matching component 119 can vary, depending on the nature of the accessed traces.

For example, the matching component 119 might perform an intelligent matching of execution traces from among pluralities of subject and/or comparison executable entities, or might intelligently match tasks performed by threads in subject thread pool and a comparison thread pool. If the matching component 119 matches execution traces from among pluralities of subject and/or comparison executable entities, in some embodiments act 1302 can comprise identifying a plurality of subject replayable execution traces, including the first replayable execution trace, and identifying a plurality of comparison replayable execution traces, including the second replayable execution trace, wherein each replayable execution trace represents a corresponding sequence of executable instructions that executed as part of a corresponding executable entity. Then, act 1302 can comprise identifying a first plurality of symbols within the plurality of subject replayable execution traces, and identifying a second plurality of symbols within the plurality of comparison replayable execution traces. Additionally, act 1302 can comprise, using the first plurality of symbols and the second plurality of symbols, identifying the first replayable execution trace and the second replayable execution trace as being traces corresponding to executable entities that performed similar work. For example, as discussed, the matching component 119 can identify a subject execution trace that has a relatively large overlap in symbols with a comparison execution trace, when compared to other subject and comparison execution traces. In embodiments, these symbols are debugging symbols. For example, debugging symbols could include information such as the name of a symbol (e.g., for functions, global variables, classes, data structures, etc.); the name of the source code file(s) in which a symbol occurs; the line number(s) at which a symbol is defined; the type of the symbol (e.g., integer, float, function, exception, etc.); the scope of the symbol (e.g., block scope or global scope); the data size of the symbol; the layout of the symbol (e.g., in the case of a data structure or class); etc.

As discussed, in some embodiments the matching component 119 scores traces by dividing a number derived from an intersection of the symbols in a subject and comparison trace by a number derived from a union of the symbols in those traces. Thus, in act 1302, identifying the first replayable execution trace and the second replayable execution trace as being traces corresponding to executable entities that performed similar work could comprise dividing (i) a first number of symbols in an intersection of a first set of symbols within the first replayable execution trace and a second set of symbols within the second replayable execution trace by (ii) a second number of symbols in a union of the first set of symbols and the second set of symbols.

As discussed, in some embodiments the matching component 119 scores traces by weighting individual symbols based on their relative frequency. Thus, in act 1302, identifying the first replayable execution trace and the second replayable execution trace as being traces corresponding to executable entities that performed similar work could comprise applying a function that weights symbols in the first replayable execution trace and the second first replayable execution trace based on how frequently each symbol occurs in at least the first replayable execution trace and the second replayable execution trace.

If the matching component 119 matches execution traces from among pluralities of subject and/or comparison executable entities, in some embodiments act 1302 comprises identifying the first replayable execution trace based on identifying a trace portion that corresponds to processing of a first task by one of a first plurality of threads in a first thread pool, and identifying the second replayable execution trace based on identifying a trace portion that corresponds to processing of the first task by one of a second plurality of threads in a second thread pool. For example, the matching component 119 can compare execution traces representing a plurality of threads in one thread pool to execution traces representing a plurality of threads in another thread pool, based on using a sliding window over symbols from those traces to determine which threads executed which tasks, and at what time. Based on these determinations, the matching component 119 can determine appropriate trace portions that correspond to the same tasks across the thread pools.

After identifying a first subject replayable execution trace and a second comparison replayable execution trace (whether or not matching was used), method 1300 also includes an act 1303 of identifying function calls within the subject and comparison traces. In some embodiments, act 1303 comprises identifying a first plurality of function calls within the first sequence of executable instructions, and identifying a second plurality of function calls within the second sequence of executable instructions. For example, the diffing component 117 can utilize first symbols within the first subject replayable execution trace, and utilize second symbols within the second comparison replayable execution trace, to identify a corresponding sequence of function calls within the executable instructions represented by each of those traces.

Method 1300 also includes an act 1304 of creating call trees from the subject and comparison traces. In some embodiments, act 1304 comprises creating a first call tree representing the first plurality of function calls, and creating a second call tree representing the second plurality of function calls, each parent node to child node relationship in the first and second call trees representing a corresponding caller function to callee function relationship. For example, the diffing component 117 can create call trees, such as call trees 1101 and 1101' from the sequences of function calls identified in act 1303. In embodiments, each node in these call trees can have information related to the node's corresponding function associated therewith. For example, in embodiments, each node in the first and second trees defines at least one of the following for a corresponding function: (i) whether or not the corresponding function returned, (ii) whether or not the corresponding function threw an exception, (iii) a return type of the corresponding function, (iv) a return value of the corresponding function, (v) one or more parameter types of the corresponding function, or (vi) one or more parameter values of the corresponding function.

Method 1300 also includes an act 1305 of creating a differencing tree from the call trees. In some embodiments, act 1305 comprises creating a differencing tree comprising a plurality of differencing tree nodes that each indicates a corresponding differencing status between the first call tree and the second call tree, the differencing status for each differencing tree node indicating at least one of (i) equality of a corresponding first node in the first call tree and a corresponding second node in the second call tree, (ii) replacement of the first node in the first call tree by the second node in the second call tree, (iii) presence of the first node in the first call tree but not in the second call tree (i.e., a deletion), or (iv) presence of the second node in the second call tree but not in the first call tree (i.e., an insertion). In embodiments, the first node and the second node are considered equal when a first set defined as the children of the first node is the same as a second set defined as the children of the second node. In embodiments, the first node is considered replaced by second node when the first set is different than the second set. For example, the diffing component 117 can create a differencing tree, such as differencing tree 1201, from the call trees created in act 1304.

Method 1300 also includes an act 1306 of assigning costs to nodes in the differencing tree. In some embodiments, act 1306 comprises assigning a corresponding differencing cost to each of the plurality of differencing tree nodes, the differencing cost for each differencing tree node being based on (i) the differencing status for the differencing tree node, and (ii) an aggregation of differencing costs for descendants of the differencing tree node. For example, the diffing component 117 can assign a differencing cost to each node based on whether that node indicated equality, replacement, insertion, or deletion, plus an aggregation (e.g. sum, average, max, median, etc.) of the differencing cost(s) of the node's descendant(s). The cost attributed for each of equality, replacement, insertion, and deletion can vary depending on implementation, in an example equality has a cost of zero, replacement has a cost that varies depending on the nature of the replacement, and insertion and deletion have the same cost. Since the cost of a replacement can vary due to the nature of the replacement, in embodiments, assigning a differencing cost to at least one of the plurality of differencing tree nodes comprises assigning the differencing cost based on replacement of a particular first node in the first call tree by a particular second node in the second call tree to arrive at the second call tree, and a value of the differencing cost is based on at least one of (i) whether a first name of a first function corresponding to the particular first node matches a second name of a second function corresponding to the particular second node, (ii) whether a first return value of the first function matches a second return value of the second function, (iii) whether a first number of children of the particular first node matches a second number of children of the particular second node, (iv) whether the first function and the second function are part of the same library (e.g., the same DLL), or (v) whether the first function and the second function correspond to the same digital signature (e.g., as being signed by the same company).

Method 1300 also includes an act 1307 of identifying a differencing tree node representing a threshold amount of total difference. In some embodiments, act 1307 comprises, based on assigning a corresponding differencing cost to each of the plurality of differencing tree nodes, identifying a path to a particular differencing tree node based on following nodes that most contribute to differences between the first and second call trees. For example, the diffing component 117 can begin at the root of the differencing tree (e.g., node 1202) and follow a path through the tree based on identifying child nodes that contributes a threshold amount of the total cost at a given node. Various different metrics could be used to determine which node to select as meeting a threshold, such as whether a node contributes a majority of cost, whether a node contributes the most significant portion of cost, whether a node contributes a threshold percentage more cost than other node(s), etc. Thus, in embodiments, identifying the path to the particular differencing tree node could comprise identifying a child node that contributed a majority of cost at a given node, identifying a child node that contributed a greatest portion of the cost at the given node, and/or identifying a child node that contributed at least a threshold more cost than other child nodes. In embodiments, the diffing component 117 selects the particular differencing tree node when the particular differencing tree node has no child node that could meet the threshold being used (e.g., node 1203 in the example of FIG. 12). The diffing component 117 can correlate this particular node to node(s) in call trees 1101 and 1101' (e.g., nodes 1103 and 1103'), and their corresponding functions.

Method 1300 also includes an act 1308 of providing an indicia of a difference between the function calls. In some embodiments, act 1308 comprises, based on identifying the particular differencing tree node, providing to a software component at the computer system, or to another computer system, one or more indicia of a difference between the first plurality of function calls and the second plurality of function calls. For example, the output component 118 can indicate that the functions identified from the particular differencing tree node selected in act 1308 represent a difference between the first plurality of function calls and the second plurality of function calls.

Accordingly, the techniques described herein can perform a tree-based diffing of replayable execution traces, which is based on creating call trees for different traces, and then creating a differencing tree for those call trees. Each node in the differencing tree characterizes a difference, or equality, between the call trees. Each node in the differencing tree also represents a differencing score of that node, together with the total differencing scores of any descendant nodes. These differencing scores are used to identify a difference between the traces used to create the call trees. By performing tree-based diffing in these ways, the diffing algorithm can quickly and efficiently focus in on the nodes that contributed most to total difference between the call trees. In addition the techniques described herein can efficiently match subject and comparison traces, or portions thereof, based on similarities in the work that was being performed by the entities represented by those traces. In this way, the embodiments can focus the more expensive diffing operations on only those traces that were performing similar work, and which would likely produce useful and reliable diffing results.

Although the subject matter has been described in language specific to structural features and/or methodological acts, it is to be understood that the subject matter defined in the appended claims is not necessarily limited to the described features or acts described above, or the order of the acts described above. Rather, the described features and acts are disclosed as example forms of implementing the claims.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope. When introducing elements in the appended claims, the articles "a," "an," "the," and "said" are intended to mean there are one or more of the elements. The terms "comprising," "including," and "having" are intended to be inclusive and mean that there may be additional elements other than the listed elements.

What is claimed:

1. A method, implemented at a computer system that includes at least one processor, for performing a tree-based diffing of a subject replayable execution trace against a comparison replayable execution trace, the method comprising:

based on a first subject replayable execution trace of a prior execution of a first executable entity, creating a first call tree representing a first plurality of function calls made by the first executable entity, and based on a second comparison replayable execution trace of a prior execution of a second executable entity, creating a second call tree representing a second plurality of function calls made the second executable entity;

creating a differencing tree comprising a plurality of differencing tree nodes that each indicates a corresponding differencing status between the first call tree and the second call tree, the corresponding differencing status for each differencing tree node indicating at least one of (i) equality of a corresponding first node in the first call tree and a corresponding second node in the second call tree, (ii) replacement of the first node in the first call tree by the second node in the second call tree, (iii) presence of the first node in the first call tree but not in the second call tree, or (iv) presence of the second node in the second call tree but not in the first call tree; and assigning a corresponding differencing cost to each of the plurality of differencing tree nodes, the differencing cost for each differencing tree node being based on at least the differencing status for the differencing tree node;

based on assigning a corresponding differencing cost to each of the plurality of differencing tree nodes, identifying a path to a particular differencing tree node based on following nodes that most contribute to differences between the first and second call trees; and based on identifying the particular differencing tree node, providing to a software component at the computer system, or to another computer system, one or more indicia of a difference between the first plurality of function calls and the second plurality of function calls.

2. The method of claim 1, further comprising identifying the first subject replayable execution trace and the second comparison replayable execution trace based on at least:

identifying a plurality of subject replayable execution traces, including the first subject replayable execution trace, and identifying a plurality of comparison replayable execution traces, including the second comparison replayable execution trace, wherein each replayable execution trace represents a corresponding sequence of executable instructions that executed as part of a corresponding executable entity;

identifying a first plurality of symbols within the plurality of subject replayable execution traces, and identifying a second plurality of symbols within the plurality of comparison replayable execution traces; and using the first plurality of symbols and the second plurality of symbols, identifying the first subject replayable execution trace and the second comparison replayable execution trace as being traces corresponding to executable entities that performed similar work.

3. The method of claim 2, wherein identifying the first subject replayable execution trace and the second comparison replayable execution trace as being traces corresponding to executable entities that performed similar work comprises dividing (i) a first number of symbols in an intersection of a first set of symbols within the first subject replayable execution trace and a second set of symbols within the second comparison replayable execution trace by (ii) a second number of symbols in a union of the first set of symbols and the second set of symbols.

4. The method of claim 2, wherein identifying the first subject replayable execution trace and the second comparison replayable execution trace as being traces corresponding to executable entities that performed similar work comprises applying a function that weights symbols in the first subject replayable execution trace and the second comparison replayable execution trace based on how frequently each symbol occurs in at least the first subject replayable execution trace and the second comparison replayable execution trace.

5. The method of claim 1, further comprising identifying the first subject replayable execution trace and the second comparison replayable execution trace, and wherein:

identifying the first subject replayable execution trace comprises identifying a trace portion that corresponds to processing of a first task by one of a first plurality of threads in a first thread pool; and identifying the second comparison replayable execution trace comprises identifying a trace portion that corresponds to processing of the first task by one of a second plurality of threads in a second thread pool.

6. The method of claim 1, wherein each node in the first and second call trees defines at least one of the following for a corresponding function: (i) whether or not the corresponding function returned, (ii) whether or not the corresponding function threw an exception, (iii) a return type of the corresponding function, (iv) a return value of the corresponding function, (v) one or more parameter types of the corresponding function, or (vi) one or more parameter values of the corresponding function.

7. The method of claim 1, wherein:
the first node and the second node are equal when a first set defined as children of the first node is same as a second set defined as children of the second node; and
the first node is replaced by second node when the first set is different than the second set.

8. The method of claim 1, wherein identifying the path to the particular differencing tree node comprises at least one of identifying a first child node that contributed a majority of cost at a given node, identifying a second child node that contributed a greatest portion of the cost at the given node, or identifying a third child node that contributed at least a threshold more cost than other child nodes.

9. The method of claim 1, wherein assigning a differencing cost to at least one of the plurality of differencing tree nodes comprises assigning the differencing cost based on replacement of a particular first node in the first call tree by a particular second node in the second call tree to arrive at the second call tree, and wherein a value of the differencing cost is based on at least one of (i) whether a first name of a first function corresponding to the particular first node matches a second name of a second function corresponding to the particular second node, (ii) whether a first return value of the first function matches a second return value of the second function, (iii) whether a first number of children of the particular first node matches a second number of children of the particular second node, (iv) whether the first function and the second function are part of a same library, or (v) whether the first function and the second function correspond to a same digital signature.

10. The method of claim 1, wherein each parent node to child node relationship in the first and second call trees represent a corresponding caller function to callee function relationship.

11. The method of claim 1, wherein the differencing cost for each differencing tree node is also based on an aggregation of differencing costs for descendants of the differencing tree node.

12. The method of claim 1, further comprising identifying the first subject replayable execution trace and the second comparison replayable execution trace based at least on (i) a name of an exported function, or (ii) a relative virtual address of a function plus a module identifier.

13. A computer system, comprising:
a processor; and
one or more computer-readable media having stored thereon computer-executable instructions that are executable by the processor to cause the computer system to perform a tree-based diffing of a subject replayable execution trace against a comparison replayable execution trace, the computer-executable instructions including instructions that are executable to cause the computer system to at least:
based on a first subject replayable execution trace of a prior execution of a first executable entity, create a first call tree representing a first plurality of function calls made by the first executable entity, and based on a second comparison replayable execution trace a prior execution of a second executable entity, create a second call tree representing a second plurality of function calls made the second executable entity;
create a differencing tree comprising a plurality of differencing tree nodes that each indicates a corresponding differencing status between the first call tree and the second call tree, the corresponding differencing status for each differencing tree node indicating at least one of (i) equality of a corresponding first node in the first call tree and a corresponding second node in the second call tree, (ii) replacement of the first node in the first call tree by the second node in the second call tree, (iii) presence of the first node in the first call tree but not in the second call tree, or (iv) presence of the second node in the second call tree but not in the first call tree; and
assign a corresponding differencing cost to each of the plurality of differencing tree nodes, the differencing cost for each differencing tree node being based on at least the differencing status for the differencing tree node;
based on assigning a corresponding differencing cost to each of the plurality of differencing tree nodes, identify a path to a particular differencing tree node based on following nodes that most contribute to differences between the first and second call trees; and
based on identifying the particular differencing tree node, provide to a software component at the computer system, or to another computer system, one or more indicia of a difference between the first plurality of function calls and the second plurality of function calls.

14. The computer system of claim 13, the computer-executable instructions also including instructions that are executable to cause the computer system to identify the first subject replayable execution trace and the second comparison replayable execution trace based on at least:
identifying a plurality of subject replayable execution traces, including the first subject replayable execution trace, and identifying a plurality of comparison replayable execution traces, including the second comparison replayable execution trace, wherein each replayable execution trace represents a corresponding sequence of executable instructions that executed as part of a corresponding executable entity;
identifying a first plurality of symbols within the plurality of subject replayable execution traces, and identifying a second plurality of symbols within the plurality of comparison replayable execution traces; and
using the first plurality of symbols and the second plurality of symbols, identifying the first subject replayable execution trace and the second comparison replayable execution trace as being traces corresponding to executable entities that performed similar work.

15. The computer system of claim 13, wherein identifying the first subject replayable execution trace and the second comparison replayable execution trace as being traces corresponding to executable entities that performed similar work comprises dividing (i) a first number of symbols in an intersection of a first set of symbols within the first subject replayable execution trace and a second set of symbols within the second comparison replayable execution trace by (ii) a second number of symbols in a union of the first set of symbols and the second set of symbols.

16. The computer system of claim 13, wherein:
the first node and the second node are equal when a first set defined as children of the first node is same as a second set defined as children of the second node; and
the first node is replaced by second node when the first set is different than the second set.

17. The computer system of claim 13, wherein identifying the path to the particular differencing tree node comprises at least one of identifying a first child node that contributed a majority of cost at a given node, identifying a second child node that contributed a greatest portion of the cost at the given node, or identifying a third child node that contributed at least a threshold more cost than other child nodes.

18. The computer system of claim 13, wherein each parent node to child node relationship in the first and second call trees represent a corresponding caller function to callee function relationship.

19. The computer system of claim 13, wherein the differencing cost for each differencing tree node is also based on an aggregation of differencing costs for descendants of the differencing tree node.

20. A hardware storage device having stored thereon computer-executable instructions that are executable by a processor to cause a computer system to perform a tree-based diffing of a subject replayable execution trace against a comparison replayable execution trace, the computer-executable instructions including instructions that are executable to cause the computer system to at least:

based on a first subject replayable execution trace of a prior execution of a first executable entity, create a first call tree representing a first plurality of function calls made by the first executable entity, and based on a second comparison replayable execution trace a prior execution of a second executable entity, create a second call tree representing a second plurality of function calls made the second executable entity;

create a differencing tree comprising a plurality of differencing tree nodes that each indicates a corresponding differencing status between the first call tree and the second call tree, the corresponding differencing status for each differencing tree node indicating at least one of (i) equality of a corresponding first node in the first call tree and a corresponding second node in the second call tree, (ii) replacement of the first node in the first call tree by the second node in the second call tree, (iii) presence of the first node in the first call tree but not in the second call tree, or (iv) presence of the second node in the second call tree but not in the first call tree; and assign a corresponding differencing cost to each of the plurality of differencing tree nodes, the differencing cost for each differencing tree node being based on at least the differencing status for the differencing tree node;

based on assigning a corresponding differencing cost to each of the plurality of differencing tree nodes, identify a path to a particular differencing tree node based on following nodes that most contribute to differences between the first and second call trees; and based on identifying the particular differencing tree node, provide to a software component at the computer system, or to another computer system, one or more indicia of a difference between the first plurality of function calls and the second plurality of function calls.

* * * * *